(12) United States Patent
Gotheil-Yelle

(10) Patent No.: US 11,149,355 B2
(45) Date of Patent: Oct. 19, 2021

(54) HYDROGEN GAS GENERATOR ASSEMBLY AND SYSTEM

(71) Applicant: URIPP, LLC, Stratford, CT (US)

(72) Inventor: Scott Gotheil-Yelle, Stratford, CT (US)

(73) Assignee: URIPP LLC, Stratford, CT (US)

( * ) Notice: Subject to any disclaimer, the term of this patent is extended or adjusted under 35 U.S.C. 154(b) by 0 days.

(21) Appl. No.: 16/652,646

(22) PCT Filed: Oct. 17, 2018

(86) PCT No.: PCT/US2018/056352
§ 371 (c)(1),
(2) Date: Mar. 31, 2020

(87) PCT Pub. No.: WO2019/079499
PCT Pub. Date: Apr. 25, 2019

(65) Prior Publication Data
US 2020/0240021 A1      Jul. 30, 2020

Related U.S. Application Data

(60) Provisional application No. 62/573,425, filed on Oct. 17, 2017.

(51) Int. Cl.
*C25B 9/63*     (2021.01)
*C25B 9/17*     (2021.01)
*C25B 9/65*     (2021.01)

(52) U.S. Cl.
CPC .......... *C25B 9/63* (2021.01); *C25B 9/17* (2021.01); *C25B 9/65* (2021.01)

(58) Field of Classification Search
USPC .................................. 204/260, 272
See application file for complete search history.

(56) References Cited

U.S. PATENT DOCUMENTS

2014/0054181 A1* 2/2014 Gotheil-Yelle ........... C25B 9/17
    205/637
2014/0290594 A1* 10/2014 McConahay ...... F02M 21/0278
    123/3

* cited by examiner

*Primary Examiner* — Brian W Cohen
(74) *Attorney, Agent, or Firm* — DeLio Peterson & Curcio LLC; Kelly M. Nowak

(57) ABSTRACT

A symmetrical hydrogen gas generating device comprising a symmetrical hydrogen generating device, a housing encapsulating the symmetrical hydrogen generating device, and a center-point rod residing directly in a center of the symmetrical hydrogen generating device. Together, the housing and the center-point rod improving workability and efficiency of the symmetrical hydrogen generating device. The center-point rod may be a single-piece center-point rod or a multi-piece center-point rod that resides directly at the longitudinal center of the symmetrical hydrogen generating device.

23 Claims, 28 Drawing Sheets

150

SECTION VIEW

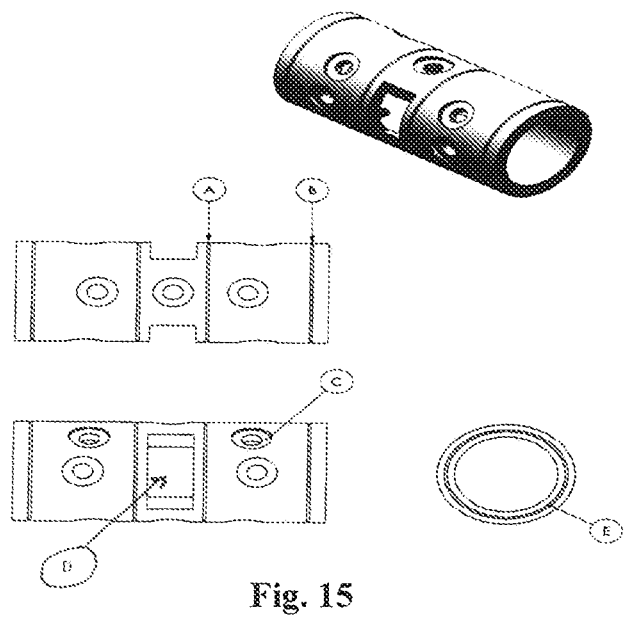
Fig. 15
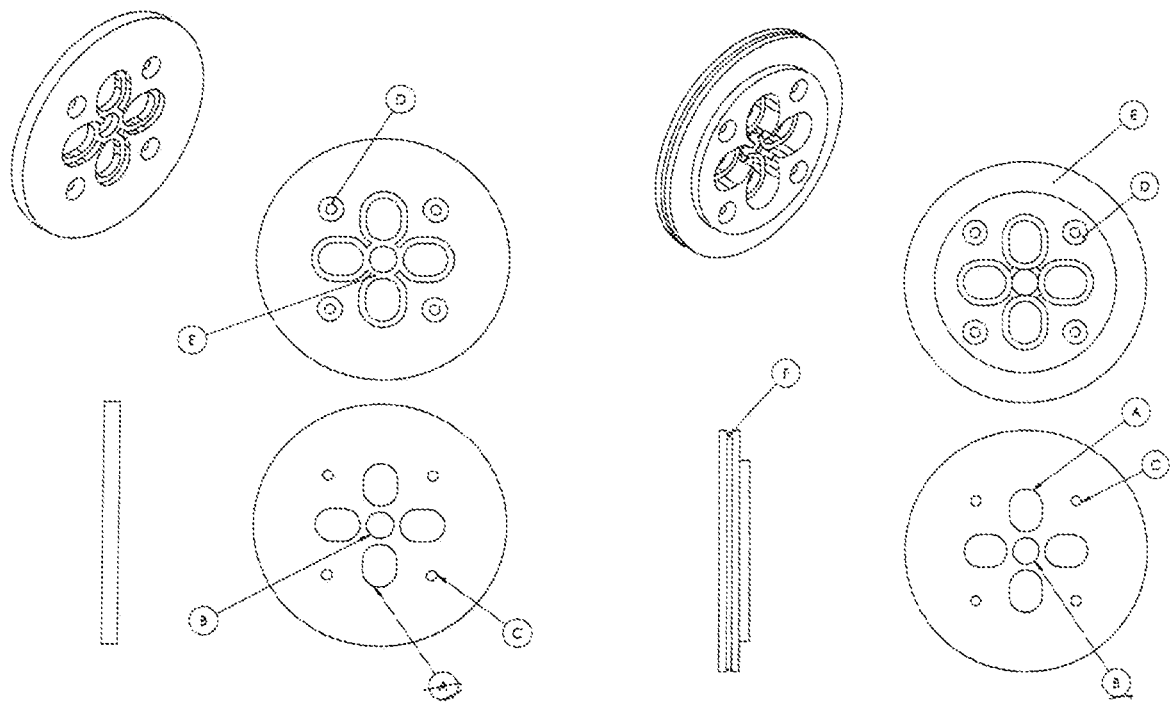
Fig. 16A
Fig. 16B

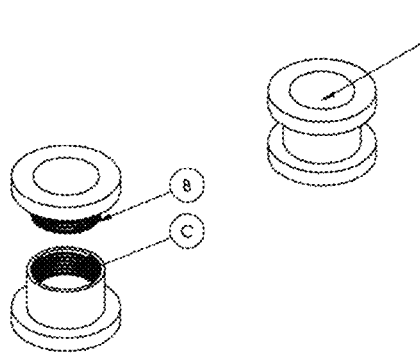
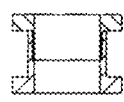 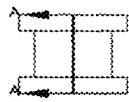
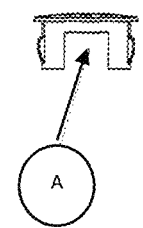
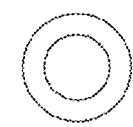
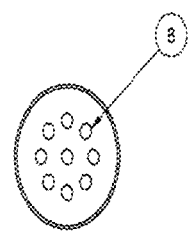
Fig. 25  Fig. 26
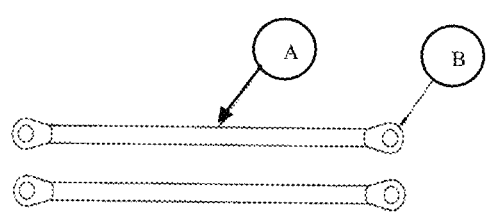
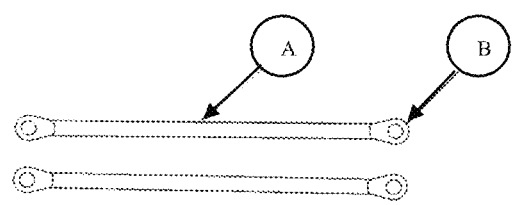
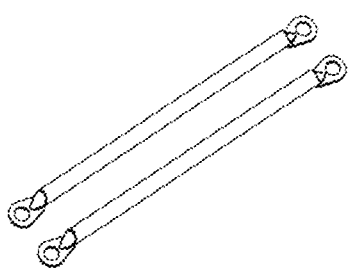
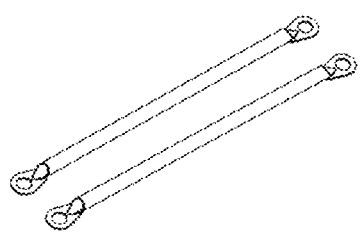
Fig. 27A  Fig. 27B

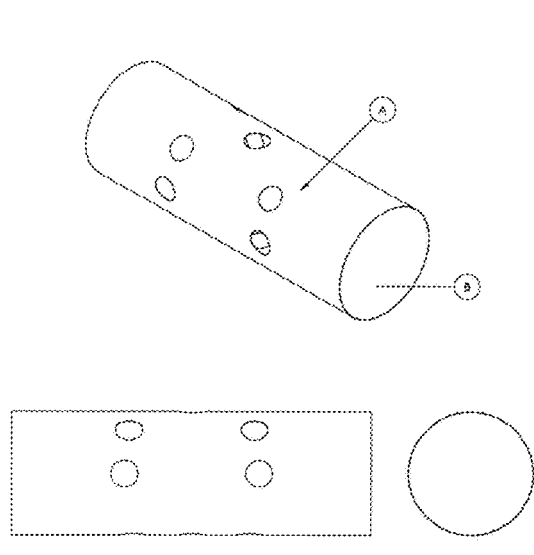
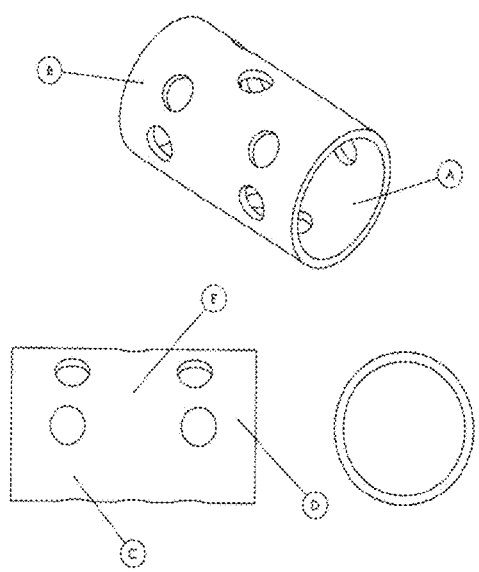
Fig. 28A  Fig. 28B
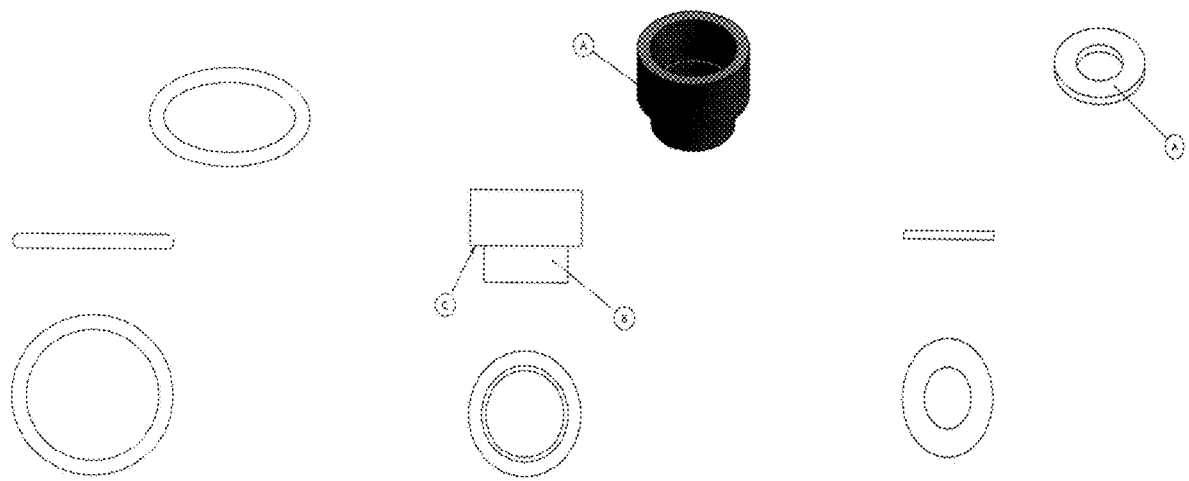
Fig. 29  Fig. 30A  Fig. 30B

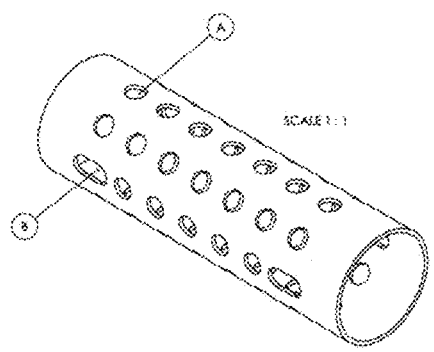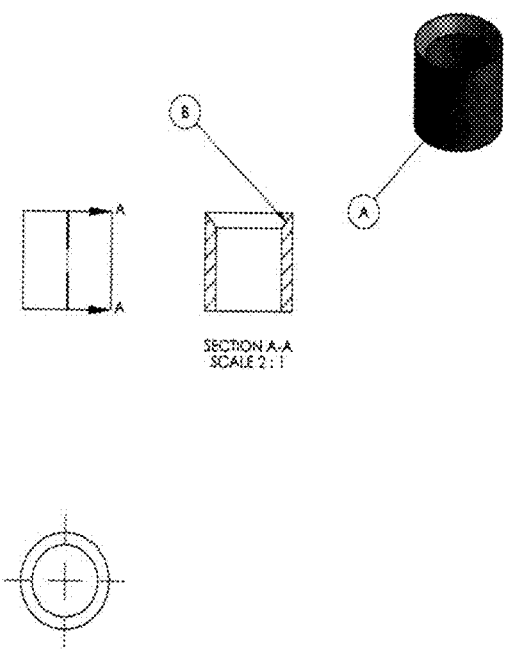
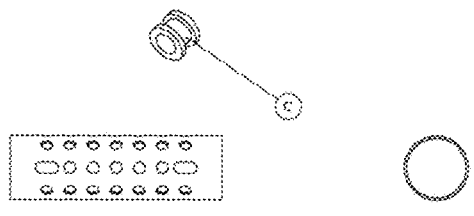
Fig. 31
Fig. 32
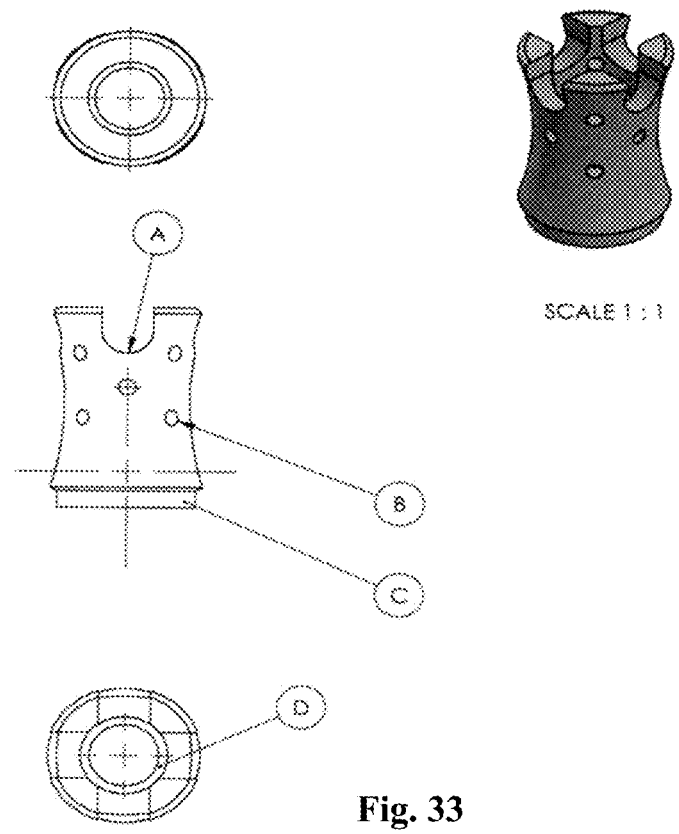
Fig. 33

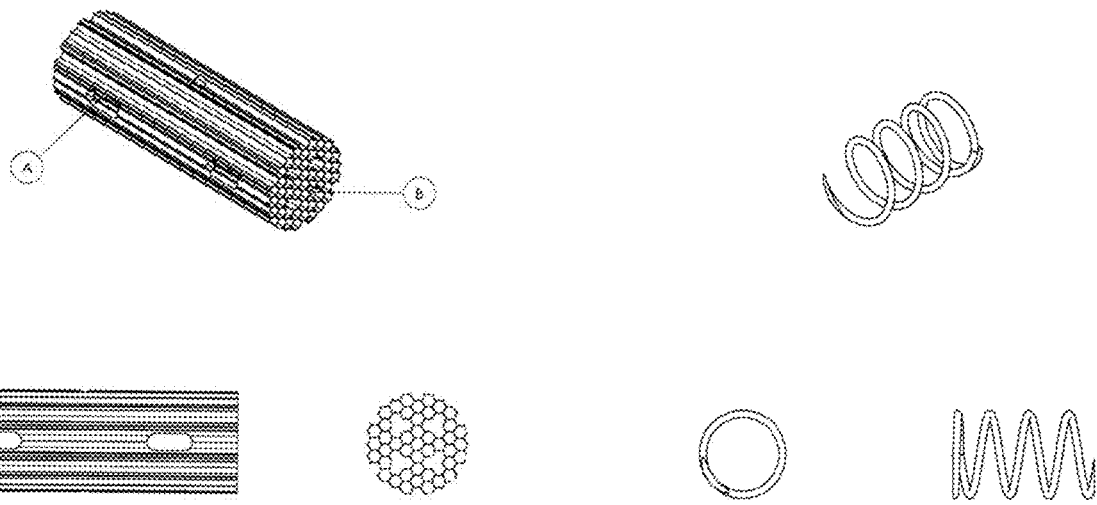
Fig. 38
Fig. 39
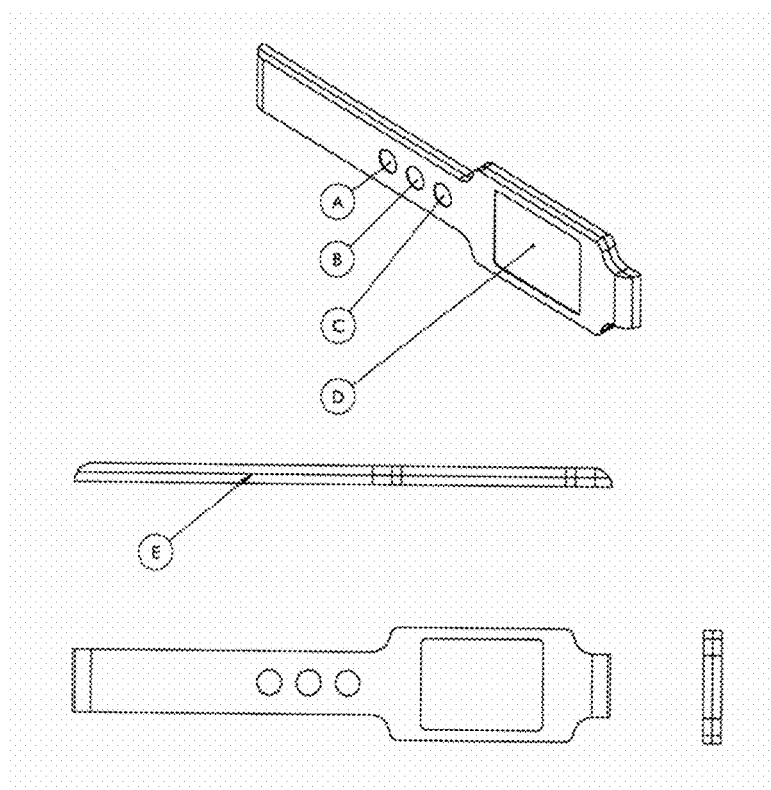
Fig. 40

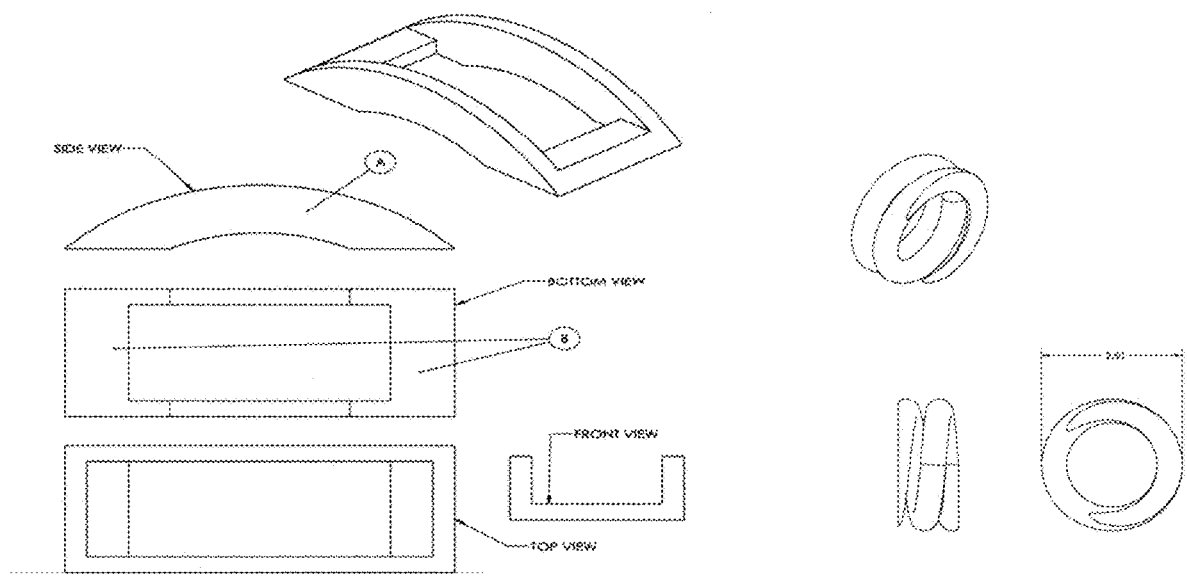
Fig. 47
Fig. 49
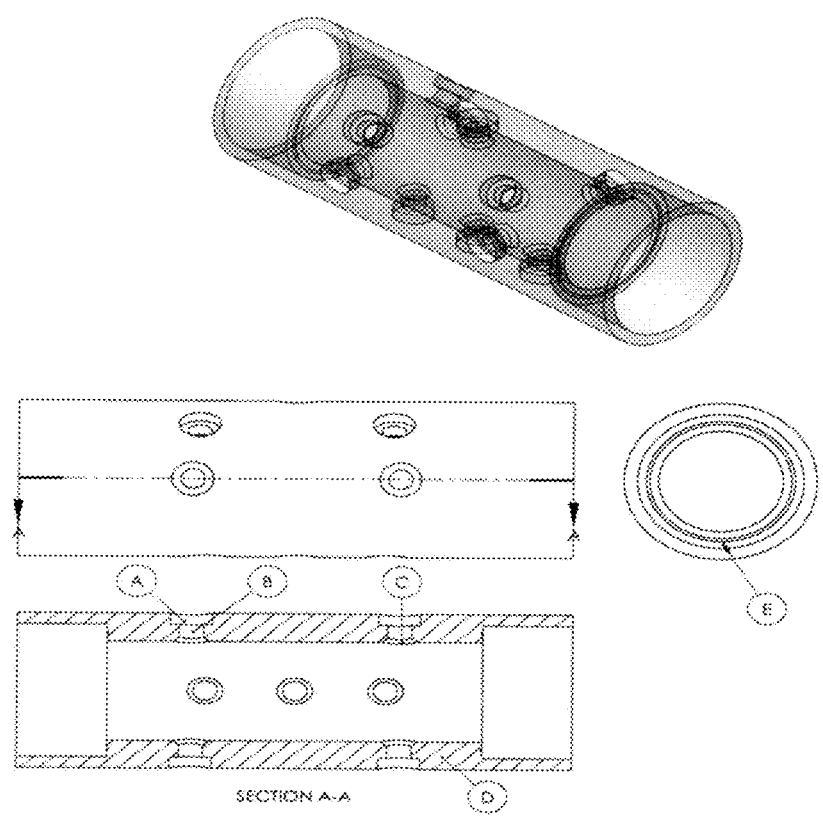
Fig. 48

HYDROGEN GAS GENERATOR ASSEMBLY AND SYSTEM

PRIORITY

This application is a National Phase of PCT/US2018/056352 filed Oct. 17, 2018, which claims priority to and the benefit of U.S. Provisional Application No. 62/573,425 filed on Oct. 17, 2017.

BACKGROUND OF THE INVENTION

1. Field of the Invention

The present invention relates to hydrogen gas generators and hydrogen gas generator assemblies and systems for the production of hydrogen gas.

2. Description of Related Art

Hydrogen generators produce a mixture of hydrogen ($H_2$) and oxygen ($O_2$) gases, typically in a 2:1 molar ratio, the same proportion as water Hydrogen gas generators include four main components; a cathode, an anode and a salt or brine solution contained within a cavity which includes the anode and cathode. The generator usually consists of stainless-steel metal plates stacked with spacing between the plates to allow the brine solution to flow therebetween. An alternating cathode and anode plate configuration allow current to flow through the brine salt solution producing a chemical reaction when a voltage differential is placed between the anode and cathode plates.

The metal plate stack is the most common configuration for a hydrogen gas generator. One problem associated with the stacked plates is that the fluid between the plates is not easily exchanged with fresh fluid from other parts of the generator, decreasing the efficiency of the generator.

There is a need for new and improved hydrogen gas generators as well as hydrogen gas generator assemblies and systems.

Disclosure of Invention

Bearing in mind the problems and deficiencies of the prior art, it is therefore an object of the present invention to provide a device for the production of hydrogen gas.

It is another object of the present invention to provide a symmetrical hydrogen gas generating device that produces hydrogen gas more efficiently than known generators.

Still other objects and advantages of the invention will in part be obvious and will in part be apparent from the specification.

The above and other objects, which will be apparent to those skilled in the art, are achieved in the present invention which is directed to a hydrogen generating assembly that includes a symmetrical hydrogen generating device, a housing encapsulating the symmetrical hydrogen generating device, and a center-point rod residing directly in a center of the symmetrical hydrogen generating device. Together, the symmetrical hydrogen generating device, the housing and the center-point rod provide a symmetrical hydrogen gas generator. The housing and the center-point rod improve workability and efficiency of the symmetrical hydrogen gas generating device. Together, the housing and center-point rod have a symmetrical configuration.

In one or more embodiments, the center-point rod may reside longitudinally in the center of the internal cavity, may reside longitudinally at the direct center inside the symmetrical hydrogen gas generating device, reside longitudinally at a center of the housing, it may reside entirely within and be encapsulated by the symmetrical hydrogen gas generating device, or the center-point rod may extend longitudinally from a first chamber end to a second chamber end inside the symmetrical hydrogen gas generating device. The center-point rod may be attached to the housing, or it may be part of the housing.

In various embodiments the center-point rod may be a conductive material, such as, aluminum, stainless steel, brass, nylon, PTFE, PVC, CPVC, ABS, polycarbonate, Lucite, PMMA, PETE, phenol, PETG or silicone carbide. The center-point rod may be made of a solid material, it may be hollow, or it may include a coating (e.g., anodized gold electroplating, anodized silver electroplating, medical grade electro-polish, plasma, ceramic, marine gold ceramic, gold film, gold plate, silver plate, patina, nickel coat and nitrate coat).

In one or more embodiments the center-point rod may be a single rod providing a one-piece center-point rod residing directly in the center of the symmetrical hydrogen gas generating device. In other embodiments the center-point rod may be at least two rods connected together lengthwise by a connector device providing a multi-piece center-point rod residing directly in the center of the symmetrical hydrogen gas generating device. The rods may be connected together by connector devices having one or more openings therein for securing a material within the opening, whereby the material provides desired function(s) to the symmetrical hydrogen gas generator. These materials may be one or more magnets, or one or more crystalline materials. In those embodiments wherein the center-point rod is made of two or more rods, such rods may be the same conductive material or different conductive materials.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 15 illustrates a revised metal sleeve according to the present invention.

FIGS. 16A-16B illustrate revised perforated walls and revised spacer rings, respectively, according to the present invention.

FIG. 25 illustrates the separation grommets of the symmetrical hydrogen gas generators in accordance with the invention.

FIG. 26 illustrates the terminal cap of the symmetrical hydrogen gas generators in accordance with the invention.

FIGS. 27A-27B respectively illustrate the anode distribution wires and cathode distribution wires of the symmetrical hydrogen gas generators of the invention.

FIGS. 28A-28B illustrate the housing film and outer cylindrical housing, respectively, of the symmetrical hydrogen gas generators in accordance with the invention.

FIG. 29 illustrates the end cap O-rings component parts of the symmetrical hydrogen gas generators of the invention.

FIGS. 30A-30B respectively illustrate the port sleeve and port sleeve washer of the symmetrical hydrogen gas generators of the invention.

FIG. 31 illustrates the multi-point cylindrical anode tube of the symmetrical hydrogen gas generators of the invention.

FIG. 32 illustrates the spring guide component part of the symmetrical hydrogen gas generators in accordance with the invention.

FIG. 33 illustrates the spring retainer component part of the symmetrical hydrogen gas generators in accordance with the invention.

FIG. 38 illustrates a honeycomb anode tube of the symmetrical hydrogen gas generators in accordance with the invention.

FIG. 39 illustrates the cathode direct connection spring of the symmetrical hydrogen gas generators of the invention.

FIG. 40 illustrates a control panel of the symmetrical hydrogen gas generators in accordance with the invention.

FIG. 47-49 respectively illustrate the transparent window seal, the one-piece housing, and the flange void of the symmetrical hydrogen gas generators in accordance with the invention.

MODE(S) FOR CARRYING OUT INVENTION

Figure 53:
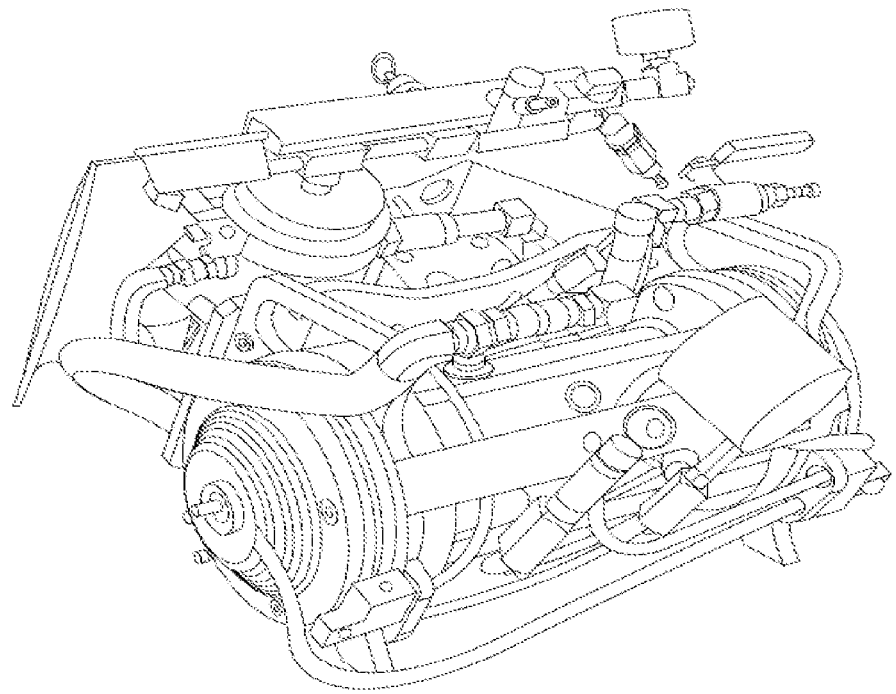

In describing the preferred embodiment of the present invention, reference will be made herein to FIGS. 1-53 of the drawings in which like numerals refer to like features of the invention.

Figure 1A:
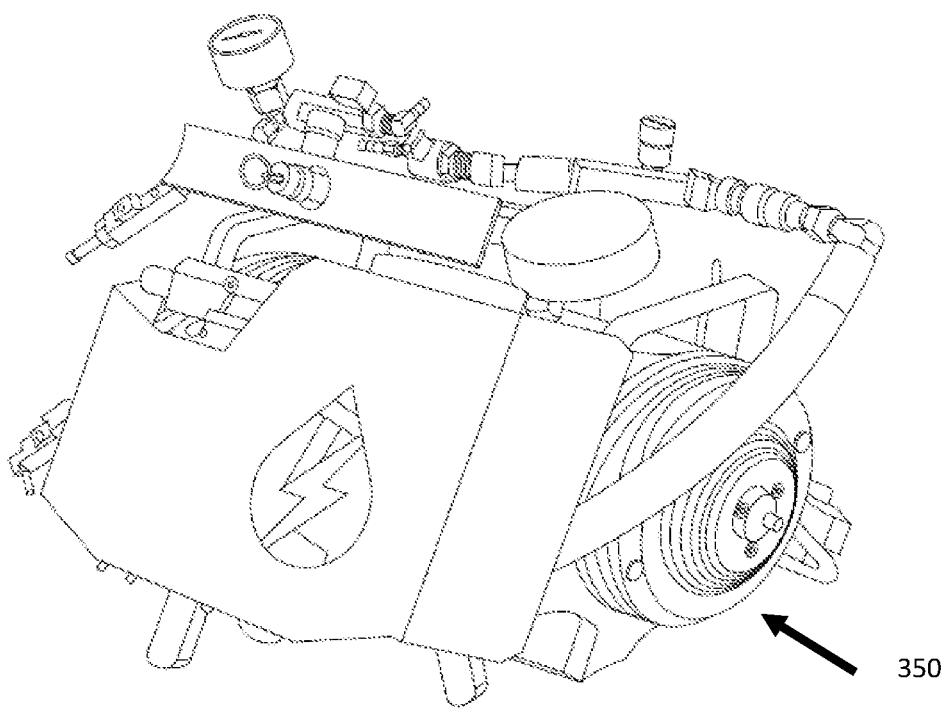
FIGS. 1A-1B illustrate side elevational views of hydrogen gas generator apparatus and systems in accordance with the invention.
Figure 1B:
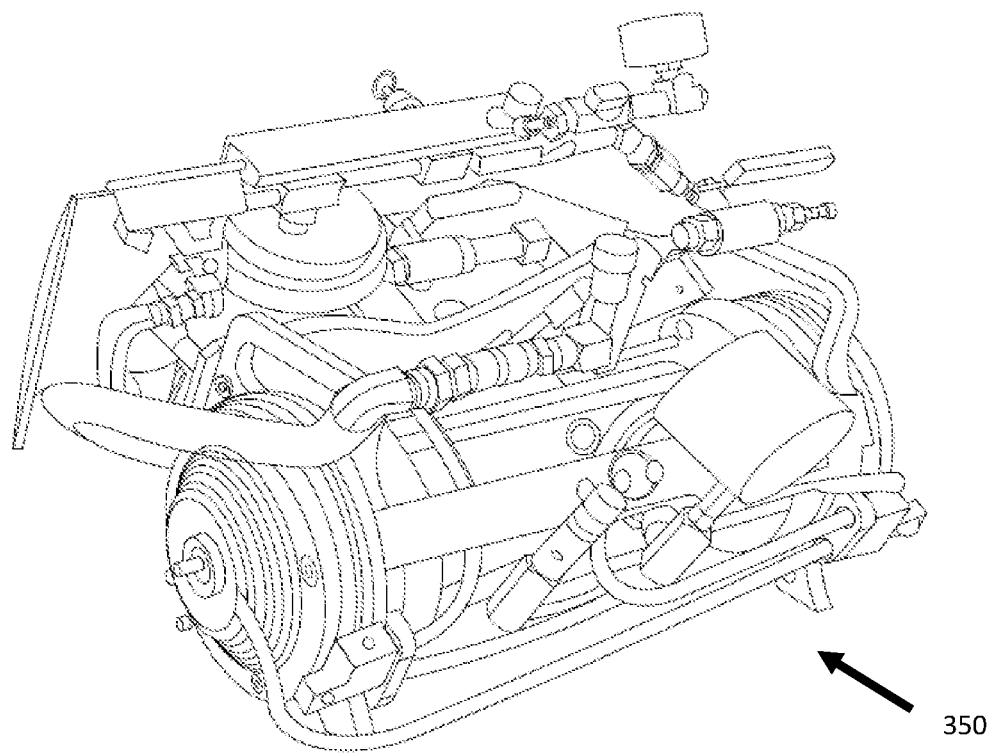
Figure 1C:
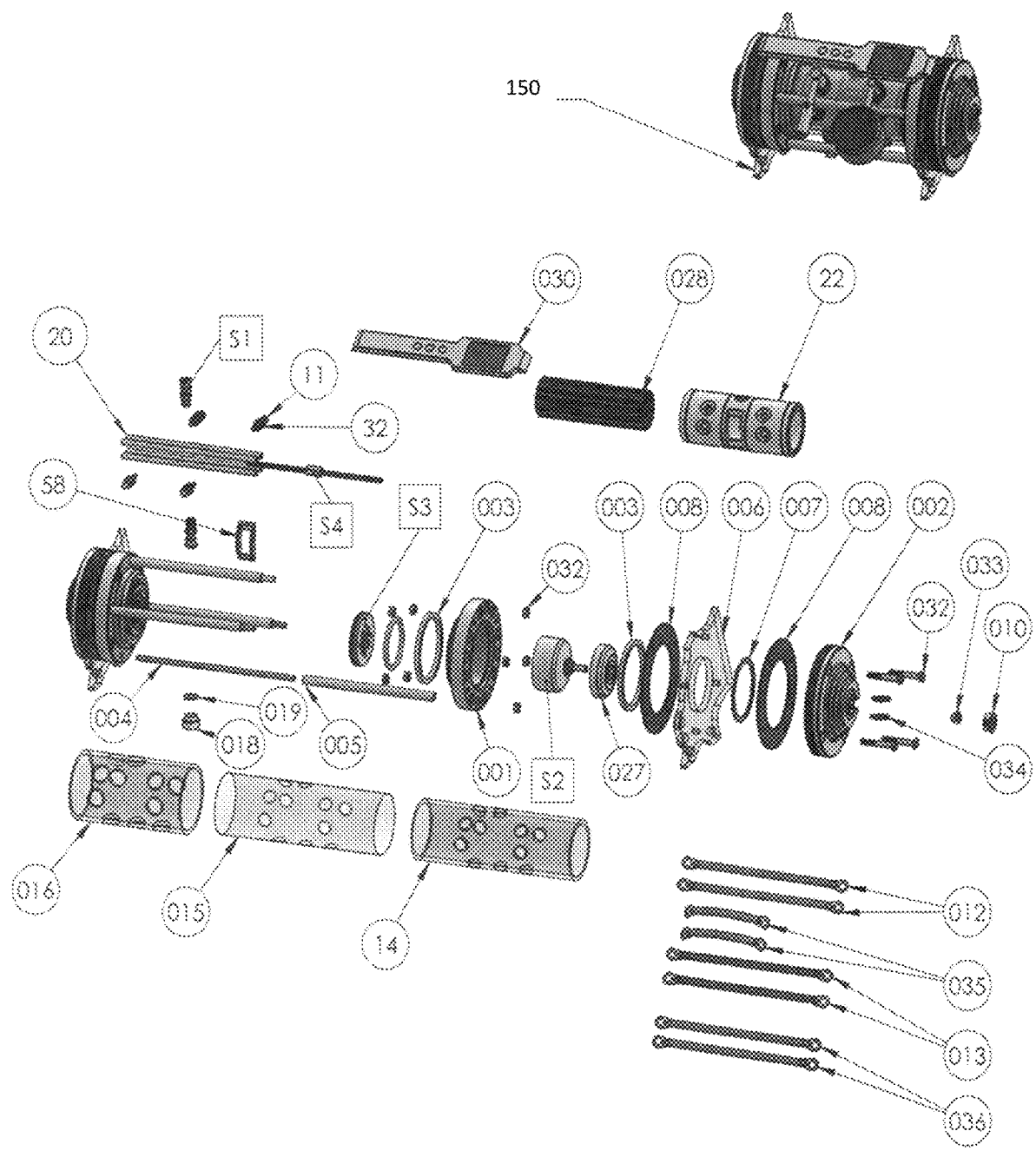
FIG. 1C illustrates parts and sub-assemblies of the hydrogen gas generator apparatus and systems of the invention.

The various embodiments of the invention are directed to hydrogen technology, and in particular, to hydrogen gas generators, assemblies and systems. FIGS. 1A and 1B illustrate various side elevational views of the hydrogen gas generator apparatus and systems 350 of the invention. The various component parts and sub-assemblies of the invention are illustrated in FIG. 1C and described in detail herein.

One or more embodiments of the invention are suitable for use with one or more symmetrical hydrogen gas generators. A particular symmetrical hydrogen gas generator suitable for use in the invention includes the hydrogen gas generators disclosed in U.S. Pat. No. 8,591,707 entitled "Hydrogen Gas Generator" ("the '707 Patent"), the entirety of which is herein incorporated by reference.

Figure 2A:
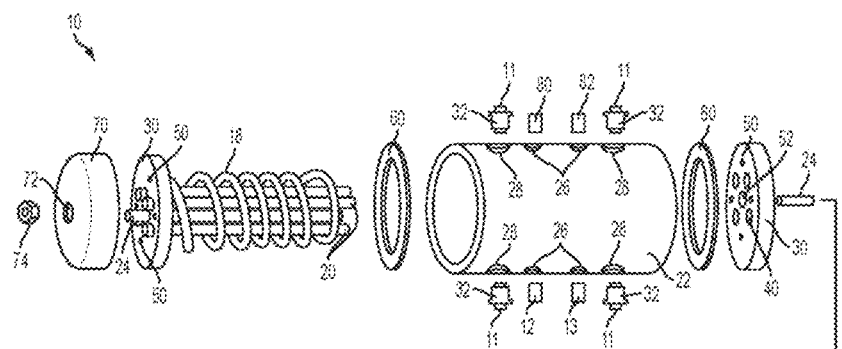
FIGS. 2A-2C illustrate side views of a symmetrical hydrogen gas generator suitable for use within the present invention.
Figure 2B:
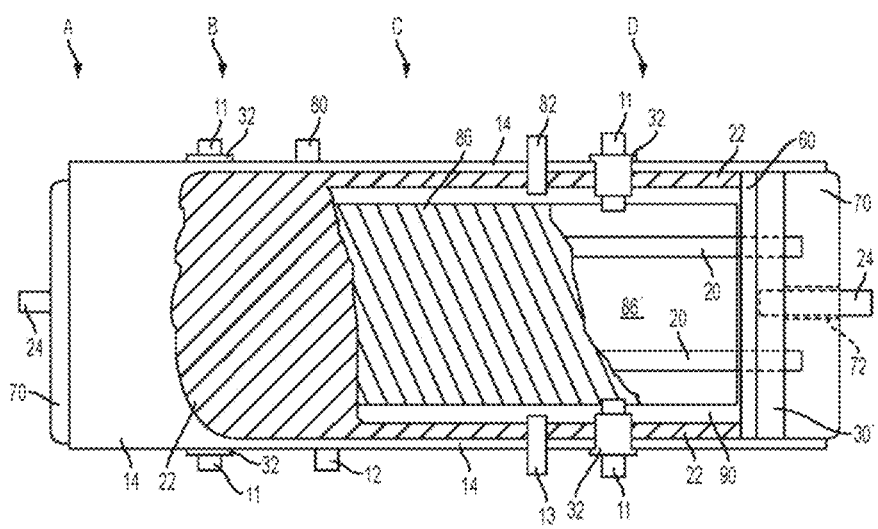
Figure 2C:
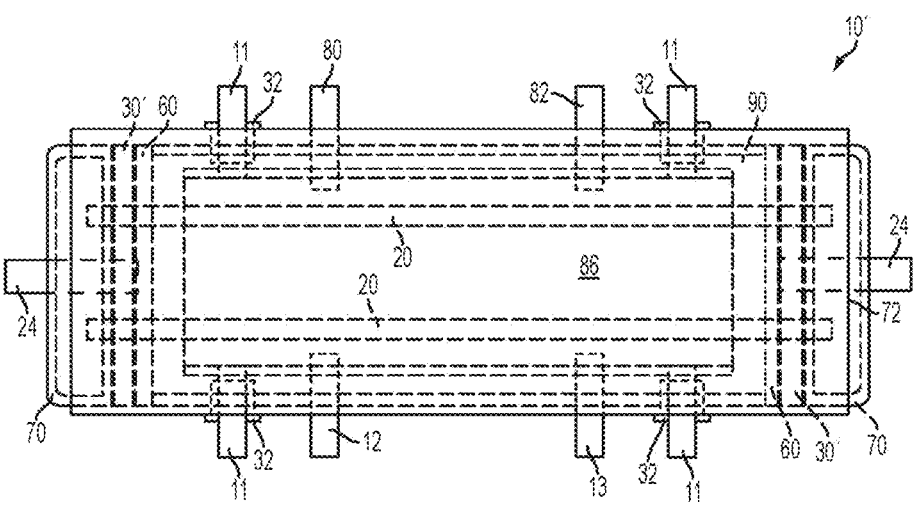

Referring to FIGS. 2A-2C, a suitable symmetrical hydrogen gas generator 10 for use in the invention includes one or more of the following components: an anode terminal 11, inlet port 12, drain port 13, cylindrical ceramic coated aluminum housing 14, housing opening 16, cylindrical anode 18, cathode rods 20, cylindrical metal sleeve 22 (including non-insulated sleeve openings 26 and insulated sleeve openings 28) slidingly disposed inside the cylindrical ceramic coated aluminum housing 14, cathode terminal 24 perforated wall 30, terminal insulator 32, rod opening 40, anode opening 44, perforations 50, end-terminal opening 52, spacer ring 60, end cap 70, end cap opening 72, anode terminal insulator 74, hydrogen gas outlet 80, purge valve 82, metal foam anode 86, metal foam bore hole 88, and brine 90.

The various embodiments of the invention include one or more components that enhance the workability and functionality of a hydrogen gas generator, and in particular, enhance workability and functionality of symmetrical hydrogen gas generators. The one or more embodiments are described herein referring to FIGS. 1-53 of the drawings, wherein components of a symmetrical hydrogen gas generator are described in relation to double-digit reference numerals (e.g., "xx"), while components of the present invention are described in relation to triple-digit reference numerals (e.g., "xxx").

Figure 7:
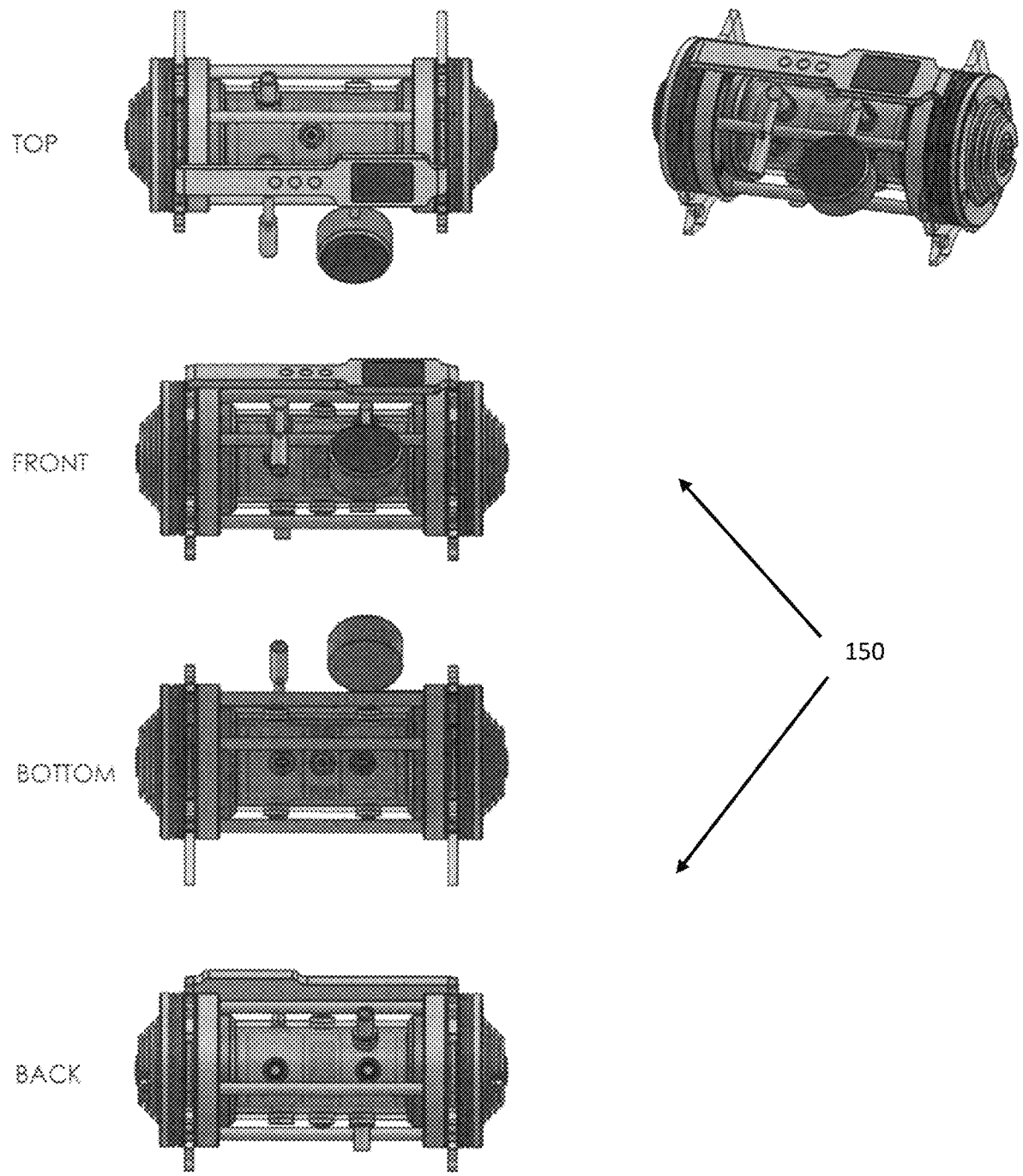
FIG. 7 illustrates various perspective views of the symmetrical hydrogen gas generator of FIGS. 6A and 6B.
Figure 8:
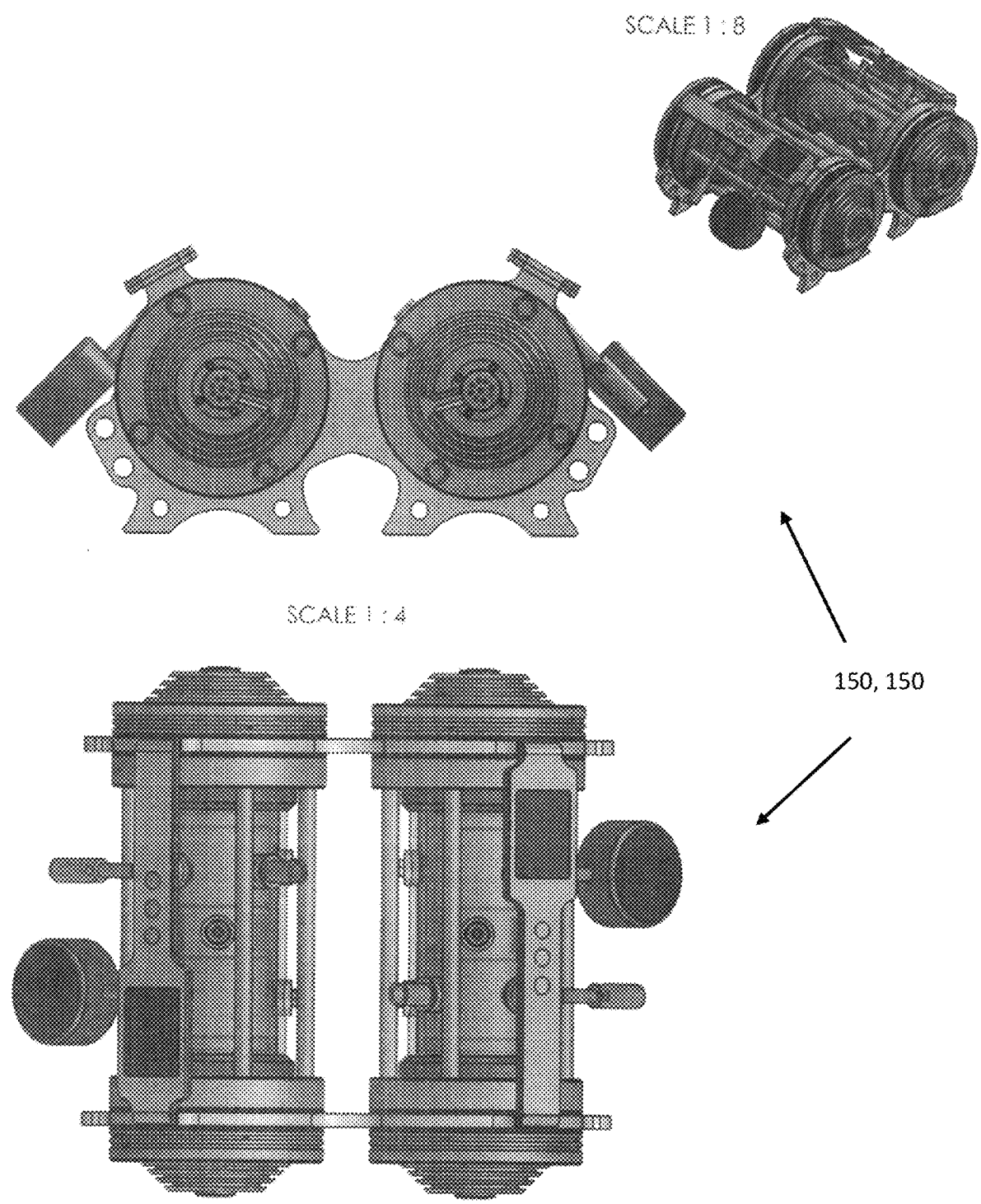
FIG. 8 illustrates at least two symmetrical hydrogen gas generators of the invention attached to one another in accordance with the invention.
Figure 9:
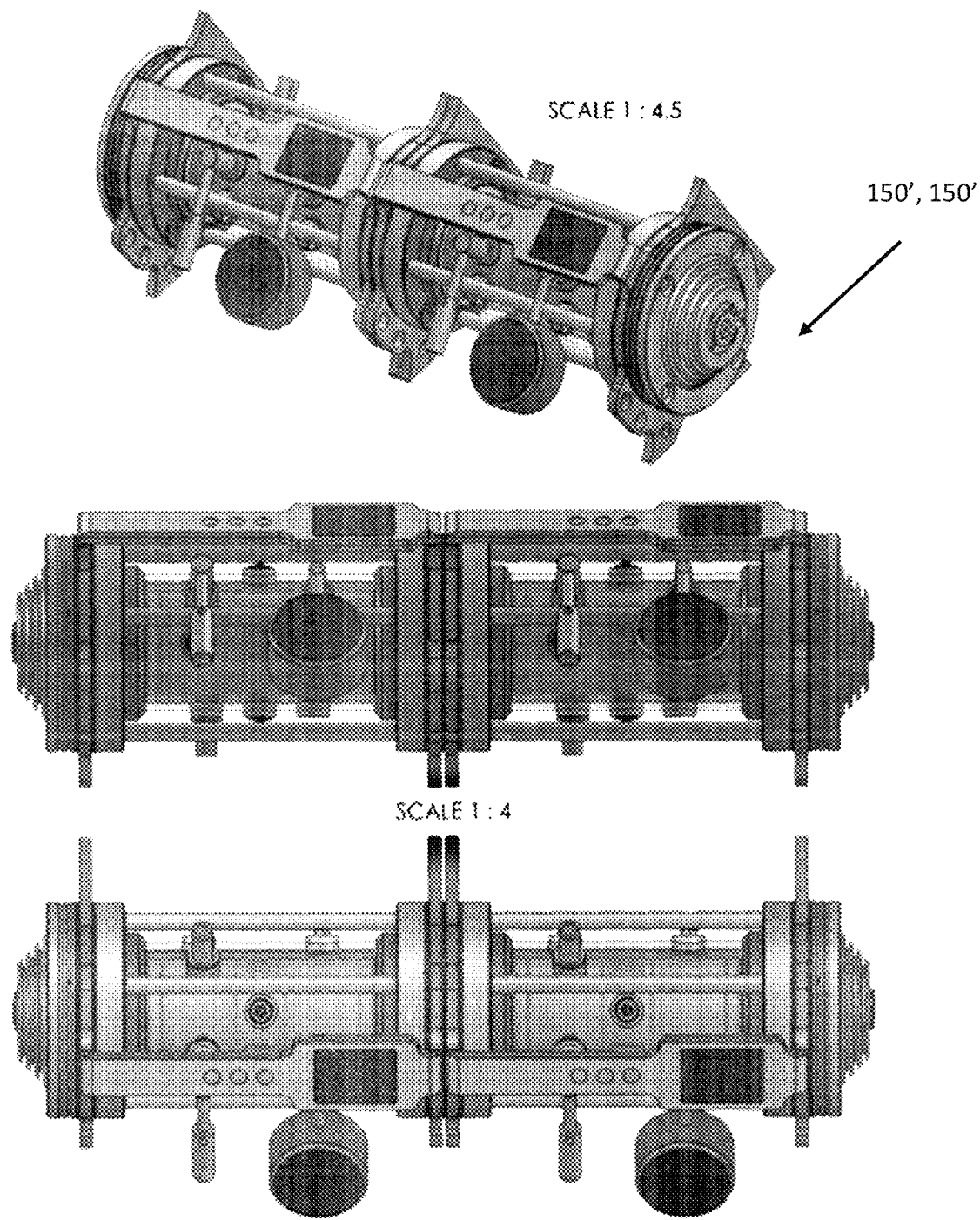
FIG. 9 illustrates alternative attachments of at least two symmetrical hydrogen gas generators in accordance with the invention.

In accordance with one or more embodiments, referring to FIG. 1C the components of the present invention include a housing 070 (see, FIG. 10) having: inner flange 001; outer flange 002; vibration resistant ring 003; flange rods 004; flange sleeves 005; flange spacer 006 (see, FIGS. 7-9); LED ring 007; flange gaskets 008; separation grommet/threaded plug 009; terminal cap 010; auxiliary anode terminals 011; anode distribution wires 012; cathode distribution wires 013; collection terminals 014; housing film 015; outer cylindrical housing 016; end cap O-rings 017; port sleeves 018 (see, FIG. 5); port sleeve washers 019 (see, FIG. 5); multi-point cylindrical anode tube 020; spring guide 022; spring retainer 023; electromagnetic deflection loop 025 (see, FIGS. 18, 36); electromagnetic wrapped coil 026 (see, FIGS. 18, 36); end cap collar 027 (see, FIG. 12); honeycomb anode tube 028; cathode direct connection spring 029; control panel 030; connection pill 031 (see, FIG. 12); adjustable anode terminals 032 (see, FIGS. 11, 41); flange set screws 034; anode loop wires 035; auxiliary distribution wires 036; cathode connection pills 037; advanced processing unit 038 (see, FIG. 4); gas/water separator 039 (see, FIG. 4); by-product return pump 040 (see, FIG. 4); a single-piece center-point rod 041 (see, FIG. 10); a multi-piece center point rod 042 (see, FIG. 14, 46); transparent window seal 043; one-piece housing 044; and flange void 045.

The various embodiments of the invention provide improved symmetrical hydrogen gas generators 150 that improve functioning and workability of known symmetrical hydrogen gas generators by providing an assembly that encases, encloses or surrounds one or more known symmetrical hydrogen gas generators. The assemblies and systems of the invention have one or more component parts that traverse through and interact with the workability and functionality of a known symmetrical hydrogen gas generator to improve the output results thereof. That is, the present improved symmetrical hydrogen gas generators 150 provide improved results and outputs as compared to known symmetrical hydrogen gas generators, such as, the generator of the '707 Patent.

In accordance with the invention one or more parts, components, assemblies and subassemblies increase the reliability, efficiency, and durability of a known symmetrical hydrogen gas generator (e.g., the symmetrical hydrogen gas generator 10) and overall system by embedding new parts of the present invention inside the hydrogen gas generator (as well as outside), and preferably at the center inside such symmetrical hydrogen gas generator. The embodiments of the invention provide improved symmetrical hydrogen gas generators that enhance known hydrogen gas generator apparatus and systems by enhancing such products' overall ability from both outside and inside, without altering from a symmetrical design.

Figure 3:
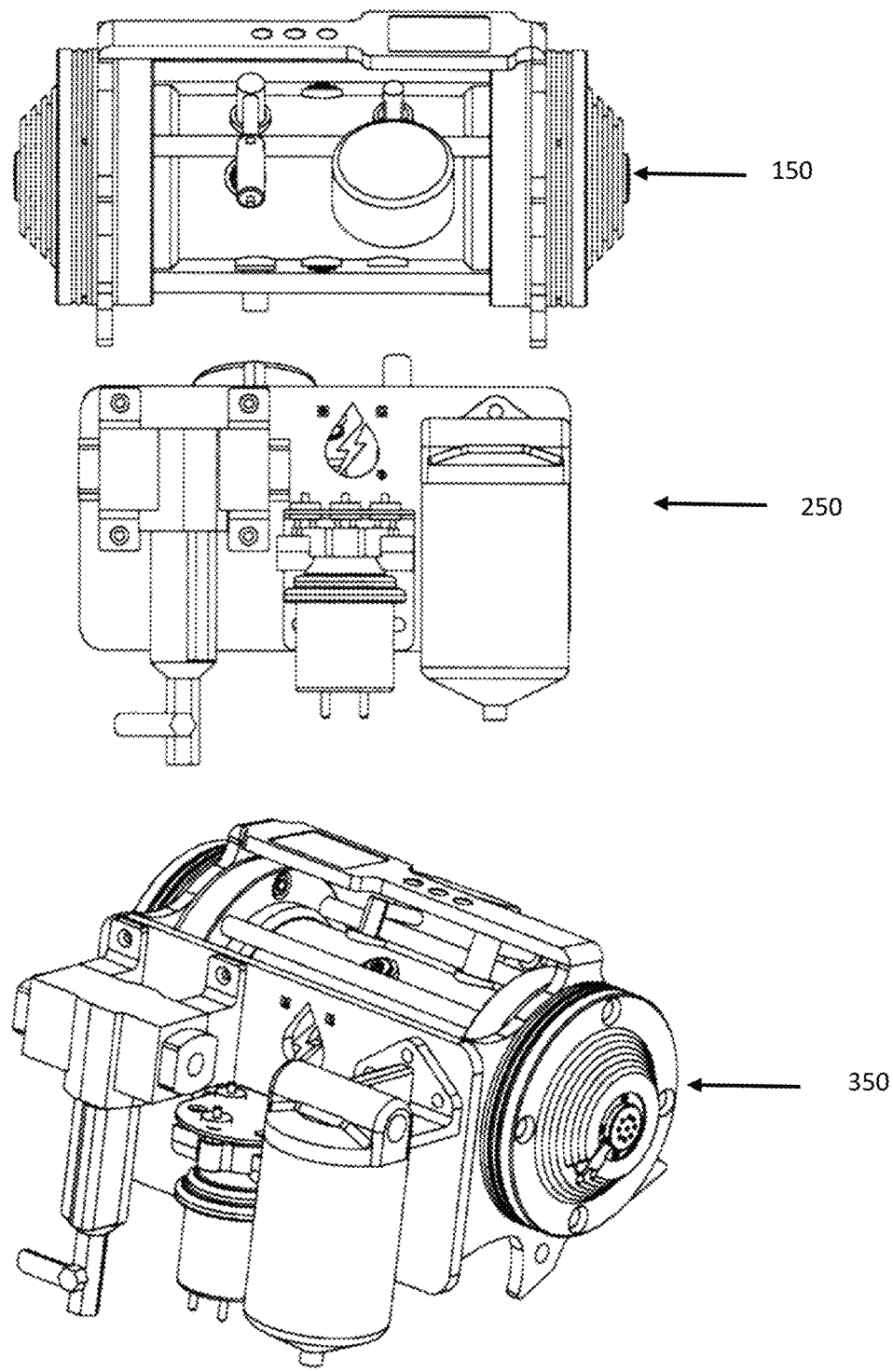
FIGS. 3 and 4 illustrate various generators, assemblies and systems in accordance with one or more embodiments of the present invention.
Figure 4:
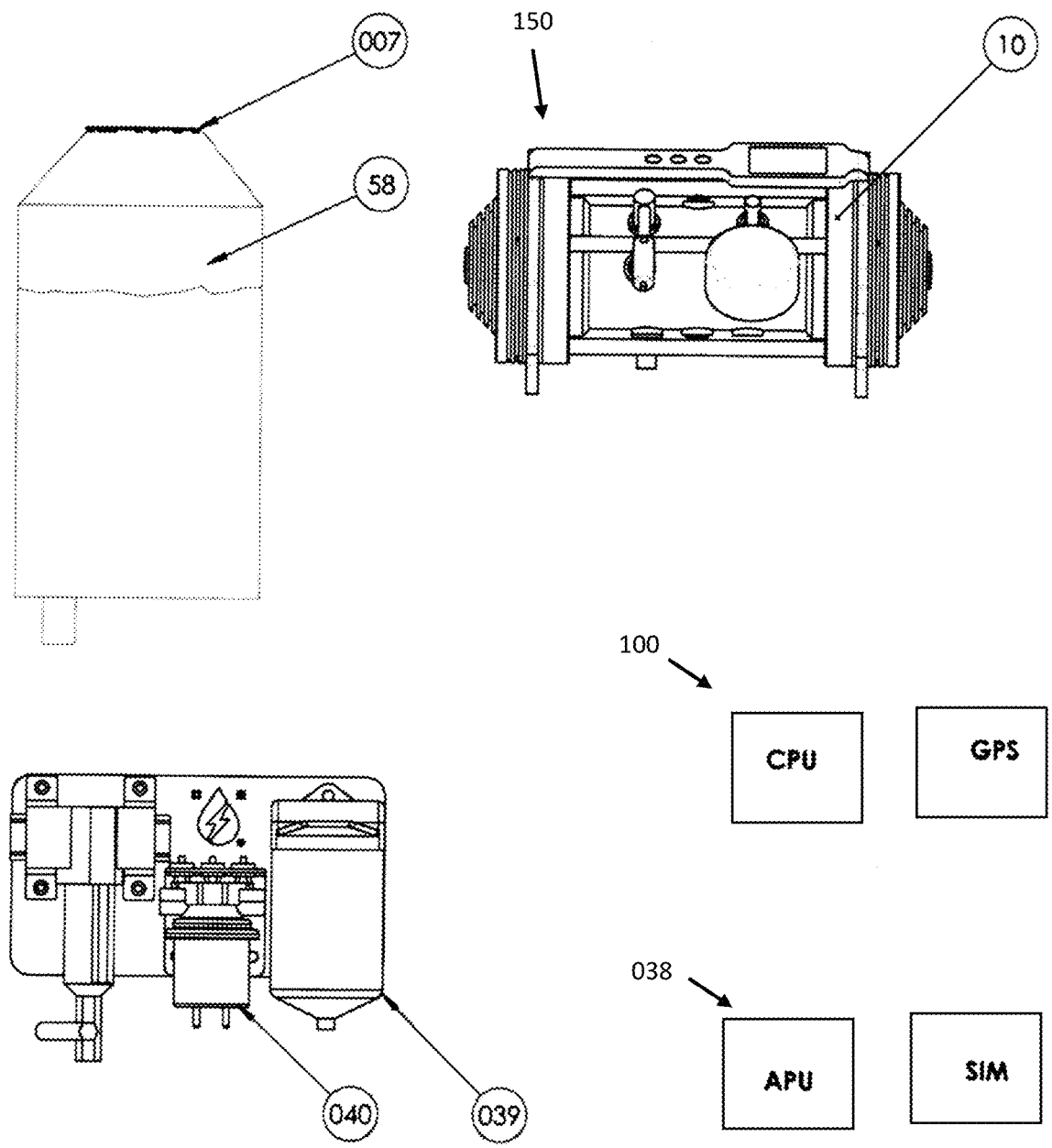

Referring to FIGS. 3 and 4, an improved symmetrical hydrogen gas generator 150 of the invention is shown along with a gas flow regulation system 250 that may be attached to the generator 150 to provide a symmetrical hydrogen gas generator assembly 350 of the invention having a gas flow regulation system 250 attached thereto. FIG. 4 shows different views of the present generator systems which may include the improved symmetrical hydrogen gas generator 150 and gas flow regulation system 250, in addition to CPU and GPS 100, and SIM and APU 038 components. These components provide generator location services that are usually ran off a "apu"—aka—a "krait processor" (a cpu+gpu combo), which is common in cell phones. With many different types of microprocessors and/or by just utilizing a cell phone, generator identification can be added through the SIM card. The gas flow regulation system 250 may include a gas/water separator 039 and a by-product return pump 040, with a reservoir tank 58 holding a brine solution 59 that is fed to the generator 150 via a feed line. The reservoir tank 58 may have an LED ring 007.

The improved symmetrical hydrogen gas generators, apparatus and systems are described in detail below in relation to the drawings of the invention. While the below description refers to one or more embodiments of the invention, it should be appreciated that various modifications may be made thereto while still falling within the scope of the present invention.

Figure 5:
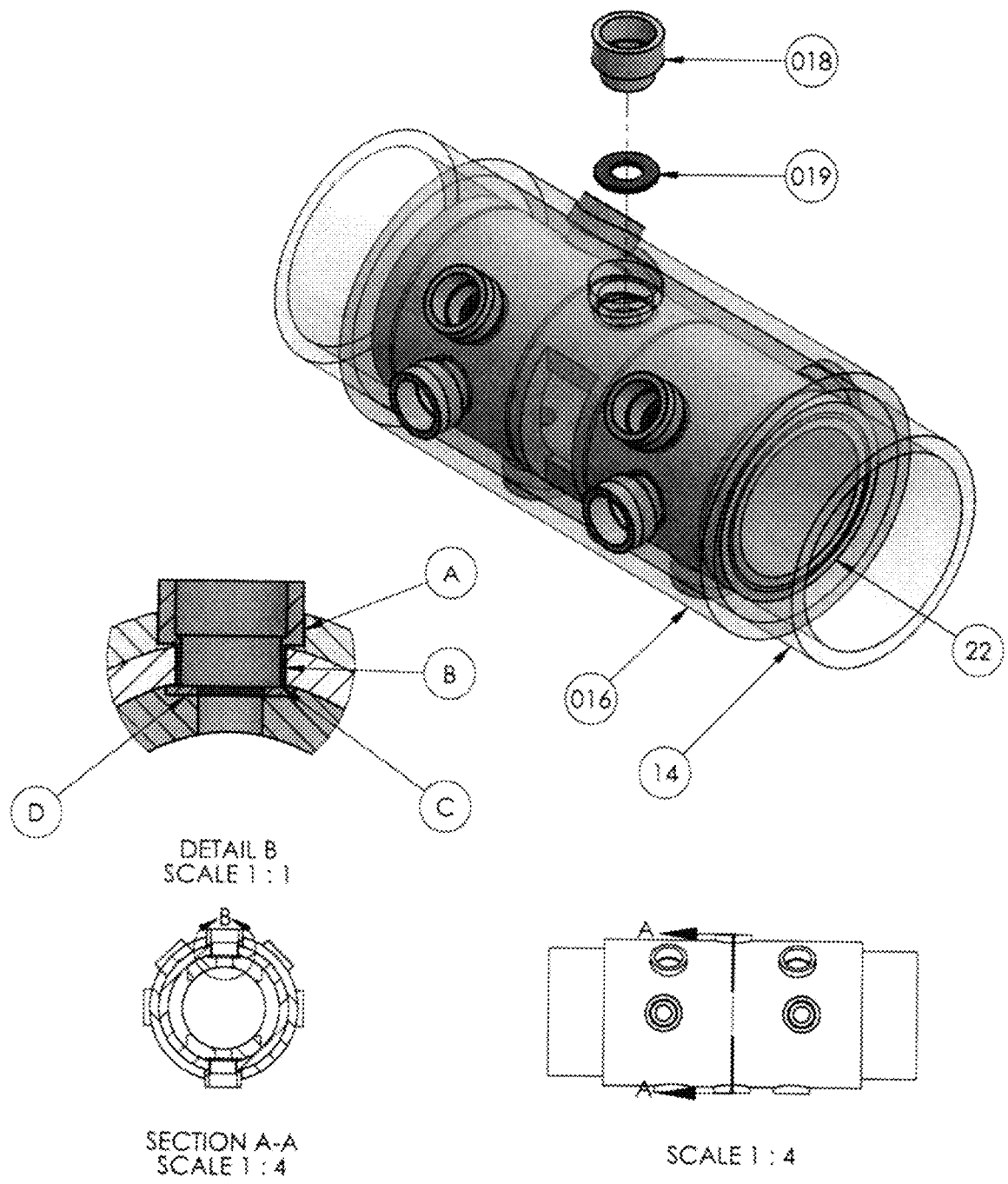
FIG. 5 illustrates various perspective views of the port sleeve assembly of the present invention.

As shown in FIG. 5, various perspective views of the port sleeve assembly of the invention are shown. As shown additional component parts of the invention include port sleeve 018, port sleeve washer 019, and outer cylindrical housing 016 that work in relation to the cylindrical housing 14 thereby providing an effective and durable seal for all ports. The port sleeve 018 top cylindrical face presses against the outer cylindrical housing 016 for a strong seal 060. The port sleeve step down smaller face is against cylindrical housing 14 for a secondary seal 061. The port sleeve bottom step 062 presses up against the port sleeve washer 063, while the port sleeve washer 063 is sandwiched between the bottom port sleeve step 062 and the metal sleeve 22. The invention provides the combination of the two (2) different sized outer faces and two (2) opposing step surfaces gives four (4) sealing points.

Figure 6A:
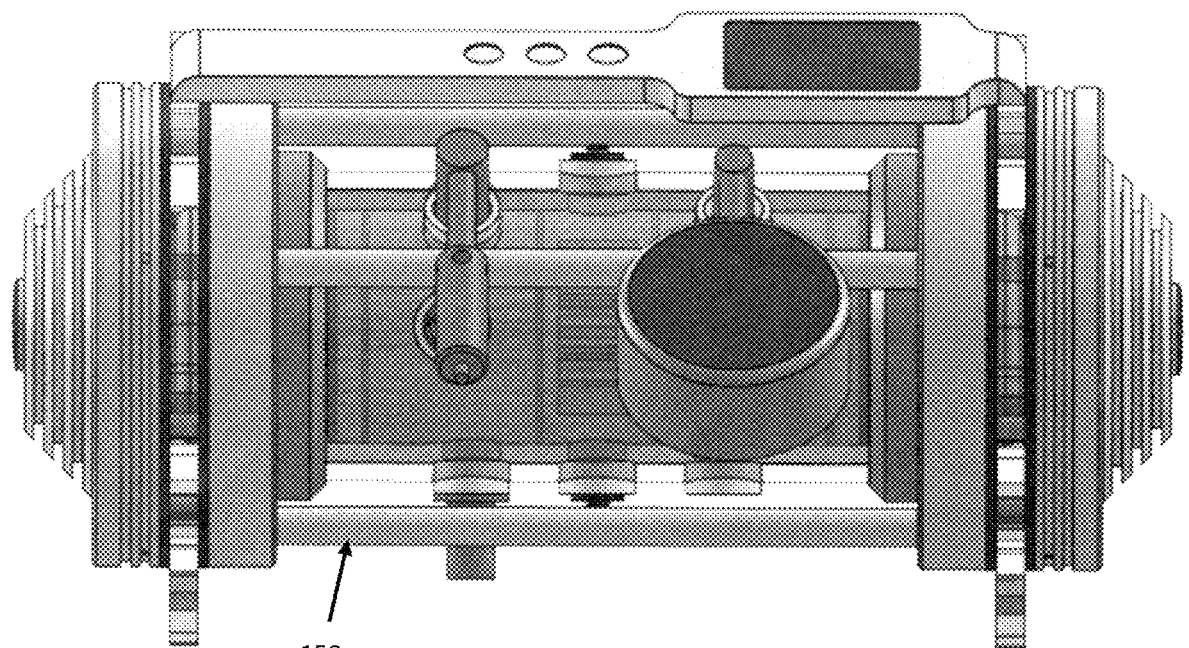
FIG. 6A illustrates a side perspective view of a symmetrical hydrogen gas generator in accordance with the invention.
Figure 6B:
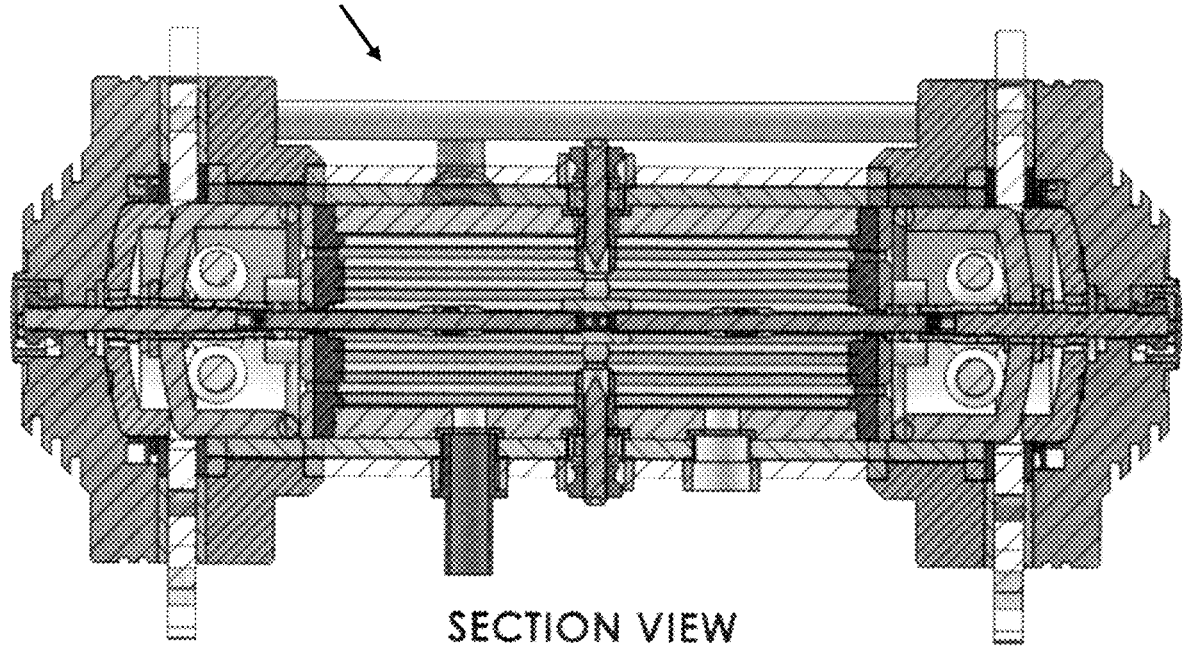
FIG. 6B is a cross-sectional view of the symmetrical hydrogen gas generator of FIG. 6A.

Referring to FIGS. 6A-9, various improved symmetrical hydrogen gas generators 150 of the invention are shown whereby each improved symmetrical hydrogen gas generator 150 may be used as a single unit hydrogen gas generator, or alternatively, two or more improved symmetrical hydrogen gas generators 150 may be joined together to work together as a multi-unit hydrogen gas generator. FIG. 6A shows a side perspective view of a symmetrical hydrogen gas generator of the invention, while FIG. 6B shows a cross-sectional view thereof. FIG. 7 shows additional views of the symmetrical hydrogen gas generators 150 according to the present invention.

As shown in FIGS. 8 and 9, in one or more embodiments of the invention a plurality of the instant symmetrical hydrogen gas generator 150 may be used and joined together. Referring to FIG. 8, at least two symmetrical hydrogen gas generators 150 are joined together in a side-by-side manner using a mirrored version of flange spacer 006 for parallel use such conjoined symmetrical hydrogen gas generators. FIG. 9 shows the symmetrical hydrogen gas generators attached end-to-end for a line configuration of two or more of the present symmetrical hydrogen gas generators 150. In one or more embodiments, the generators 150 may be linked or joined together "in line" by removal of the outer flanges 002 to allow two (2) generators 150 to mate between two (2) inner flanges 001, whereby one or more flange spacers may be used in such configuration. When connected "in line" the two generators 150 may press two (2) end caps together forming a bridge between the two (−) cathode terminals coming off the direct dead center of such end caps.

In referring to FIG. 1C and FIG. 10, various component parts of the present invention are described in detail below. FIGS. 11-48 describe these component parts of the invention in even further detail.

Figure 10:
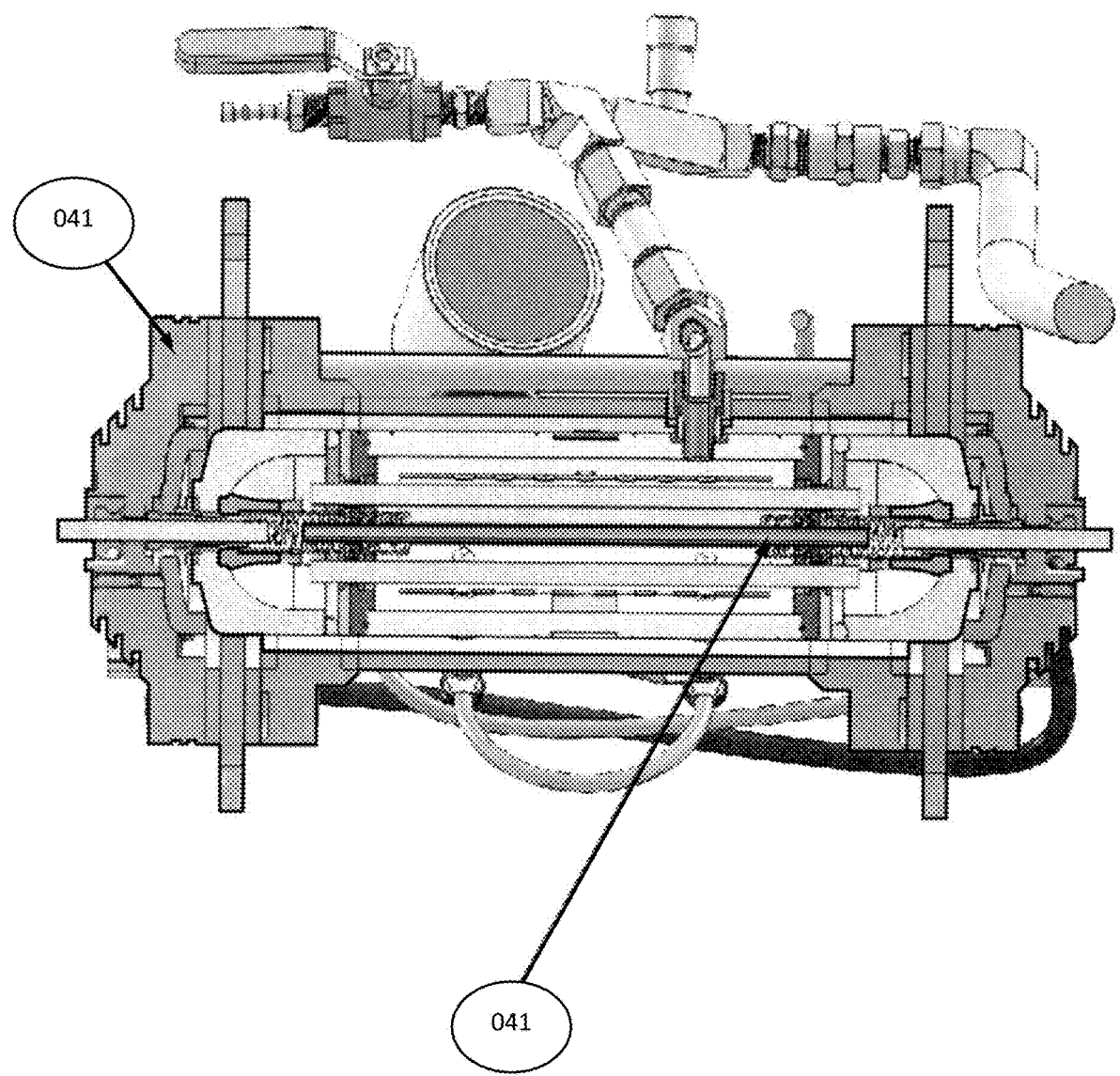
FIG. 10 illustrates a symmetrical hydrogen gas generator assembly having a single piece center-point rod according to the present invention.

Referring to FIG. 10, a housing 070 of the invention encases (encapsulates) a symmetrical hydrogen gas generator of FIGS. 2A-2C and provides a center-point rod 041 (see also, FIGS. 14, 45 and 46) at the direct dead center of the symmetrical hydrogen gas generator of FIGS. 2A-2C. In one or more embodiments, the center-point rod may be a 3-piece structure or 1-piece structure. The housing 070 is a surrounding flange assembly that covers the symmetrical hydrogen gas generator of FIGS. 2A-2C. As shown in FIG. 10, the outer flanges 002 of housing 070 reside at opposite ends thereof with flange spacers 006 residing adjacent thereto. The housing 070 includes the outer cylindrical housing 016 which provides another layer of protection as an insulating layer (see, FIGS. 28A and 28B) to the symmetrical hydrogen gas generator residing therein. The outer cylindrical housing 016 may include or be coated with various thin coating film(s) that may provide a variety of different functions, such as, provide increased strength, act as a reflective coating and/or mirrored coat for outside application to prevent heat soak, even act as an electrostatic dampener (e.g., an electrical polycarbonate film or polyurethane film), etc.

The housing 070 also includes the vibration resistant rings 003 and inner flanges 001 at opposite ends of the generator (i.e., the symmetrical generator lies between these component parts). The inner end flanges 001 (See, FIG. 17) hold or press the symmetrical hydrogen gas generator together using the flange rods 004 and flange sleeves 005 (see, FIG. 20). These inner end flanges 001 may be provided with various components inside counter bore holes fabricated in such inner end flanges 001, whereby such inserted components may function as electromagnetic field dampeners, electrostatic or frequency isolators, etc. These component parts inserted into openings or recessed residing within or through the inner end flanges 001 may include, but are not limited to, carbon capacitors, magnets, silicone dampeners, batteries, and combinations thereof, etc. These component parts may be strategically positioned or secured within both flanges to create a face to face push or pull effect. The assembly of the invention may be provided with wiring to these component parts through drilled openings in the assembly to allow for a charged flange sleeve or rod that generates a cylindrical barrier around the symmetrical hydrogen gas generator thereby providing the ability to control the entire housing frame work of the instant symmetrical hydrogen gas generator assembly 150 of the invention.

Figure 14:
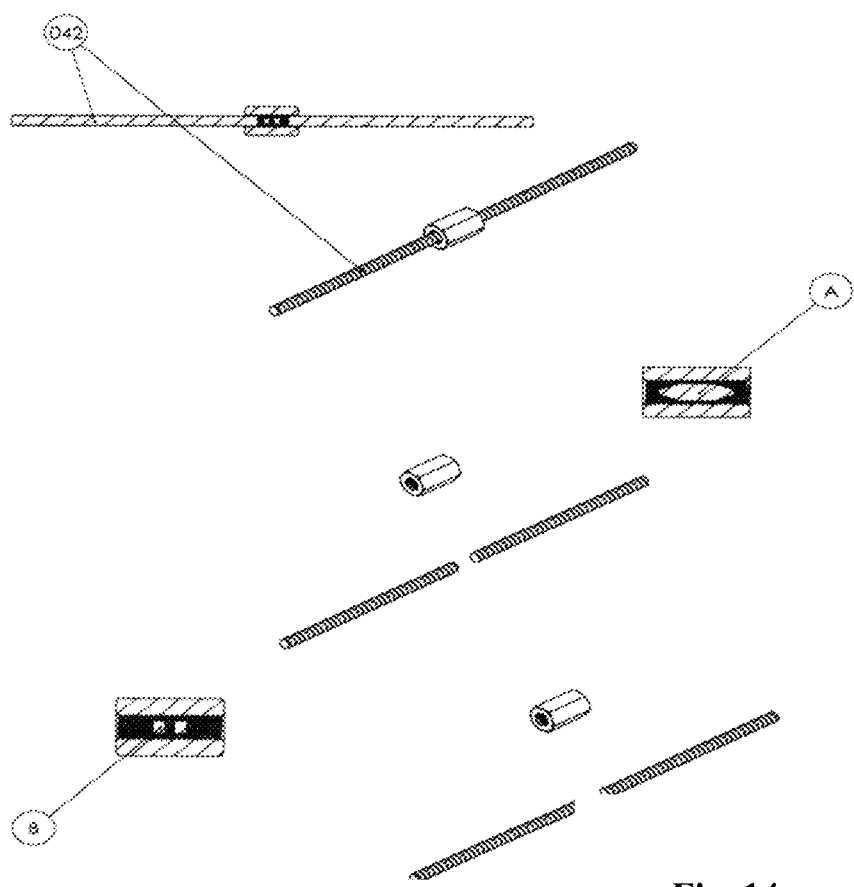

The symmetrical hydrogen gas generators 150 of the invention may include a single-piece center-point rod 041 (see, FIG. 10; 45), or alternatively, a multi-piece center point rod 042 (see, FIG. 14, 46). Referring to FIG. 10, in one or more embodiments the center-point rod is a single-piece center-point rod 041 that is positioned and secured within the symmetrical hydrogen gas generator of FIGS. 2A-2C at the direct center thereof. The center-point rod 041 provides increased efficiency and power to the generator of FIGS. 2A-2C while the entire external housing 070 and assembly of the invention work with and both maintain and regulate the extra gain(s) in power and efficiency generated and realized by use of the center-point rod 041.

In alternative embodiments, the center-point rod may be a multi-piece center point rod 042 (see, FIG. 14, 46) that includes at least two center-point rods joined together via a connection means or device. Referring to the assembly of FIGS. 14 and 46, the multi-piece auxiliary center point rod 042 is more driven towards a higher gas output (as compared to center point rod 041). For instance, use of a center point rod 042 may provide 1-liter per minute of flow without any specialized coatings. The connection means or device holding together the two separate auxiliary center point rods may be provide with components therein that generate different effects, which may work together with the outer housing to provide improved efficiency and results. For instance, the connection means that secures two separate auxiliary center point rods together may have openings or recesses therein for embedding one or more magnets therein, or even crystalline structures therein, to provided added benefits and results of the present generators 150, as discussed further below.

Figure 36:
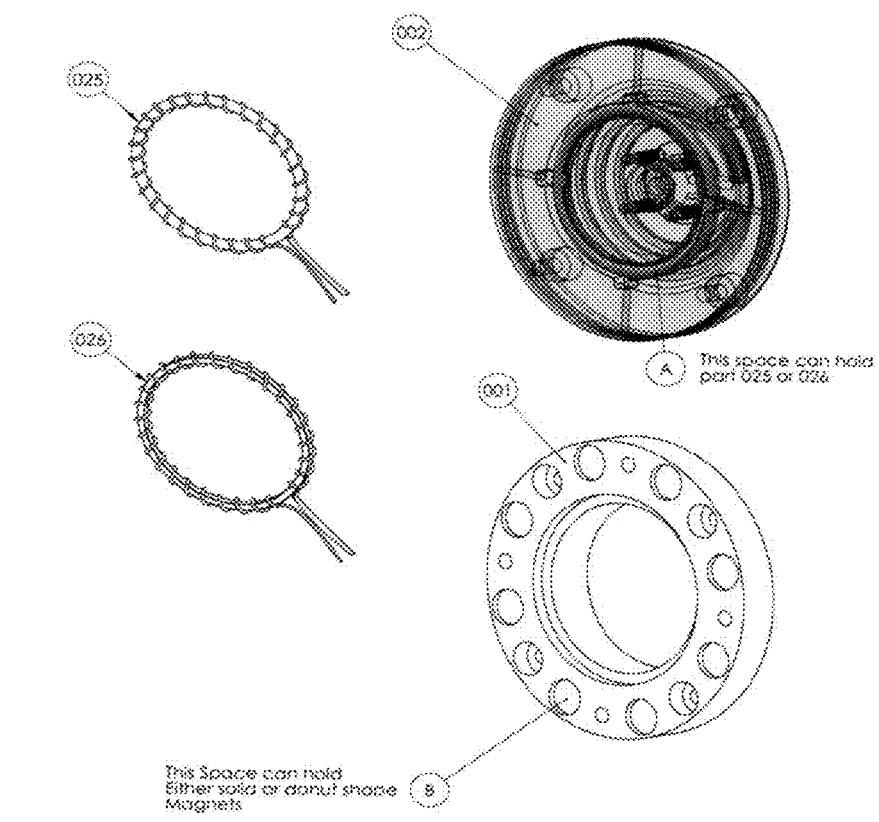

Once a desired center point rod 041, 042 has been selected, and the generator 150 assembled by compressing the two inner flanges 001 together, the overall efficiency of the generator unit may be further enhanced via the two outer flange 002 (see, FIG. 36). The selection of the center point rod 041 may directly affect the design and features of the inner flanges and outer flanges, as well as choice of either 025/026 parts to place in the outer flanges 002 (see, FIG. 18), depending upon the desired end-result and performance of the overall generator assembly and system of the invention.

The entire symmetrical hydrogen gas generator 150 of the invention continues to maintain the balance and symmetry (from the inside to the outside) of the symmetrical hydrogen gas generator of FIGS. 2A-2C residing therein. The various component parts are described in more detail below. Referring to FIGS. 11-14, one or more embodiments of the invention may include subassemblies S1, S2, S3 and S4 (see, FIG. 2) having the below described component parts.

Figure 11:
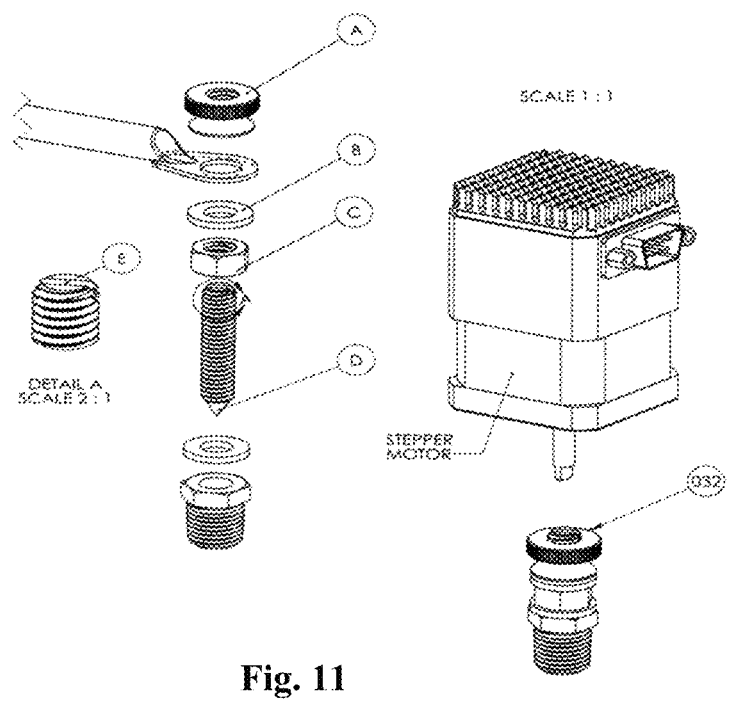
FIGS. 11-14 respectively illustrate subassemblies S1-S4 of the symmetrical hydrogen gas generators in accordance with the invention.

Referring to these figures, FIG. 11 illustrates the different parts of subassembly S1 depicting the adjustable anode terminal. Subassembly S1 is composed of an adjustable anode terminal that is a result of the generator design of FIGS. 2A-2C, which has a threaded rod anode to (+) terminal creating a 4-point symmetrical design that works together to hold the "original" 18 cylindrical anode 18 or new honeycomb anode tube 028 of the invention. This balanced design provides for an electronic stepper motor to be used on all threaded anodes in sequence and is threaded in and out to manipulate the reaction between the (+) and (−) components. Component parts include, but are not limited to, a solid threaded thumb nut 064, washer 065, placement nut 066, and a point and or a cut-off 3-sided triangle 066, 067.

Figure 12:
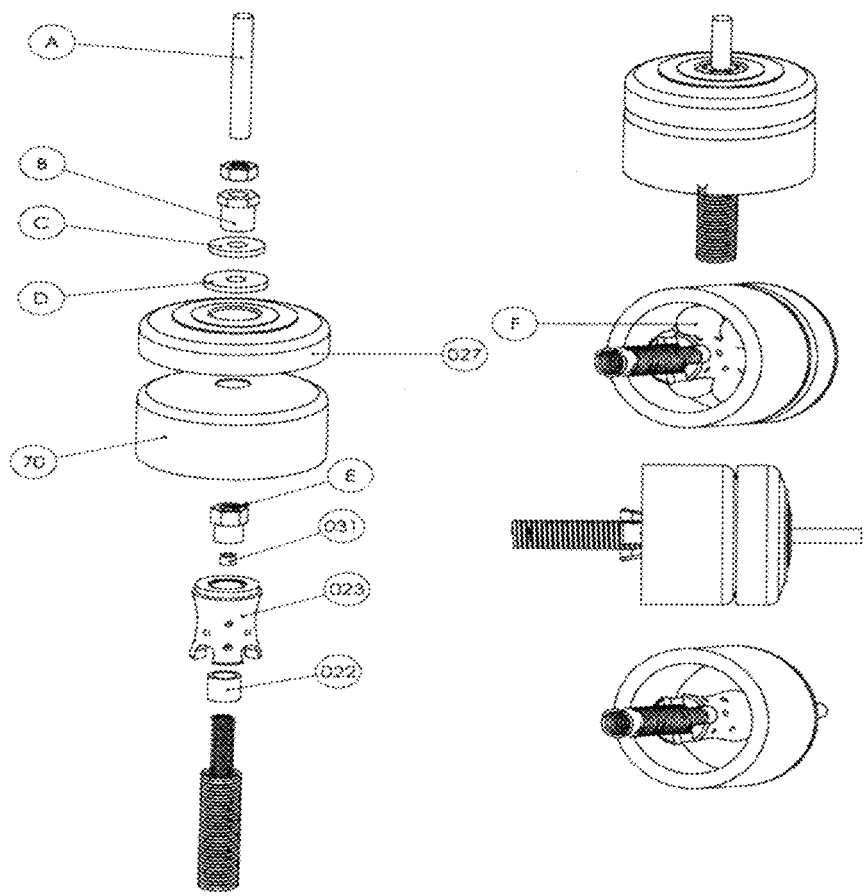

FIG. 12 shows the different component parts of the end cap subassembly S2. Subassembly S2 includes end cap components working together as one symmetrical/balanced design placing all the focus on the center ground point aka (−) terminal. Component parts include, but are not limited to, an end cap back end terminal rod backer, and a generally hollow aluminum or stainless balls that help amp up the negative capacitance charge within the end cap chambers by adding more conductive mass.

Figure 13:
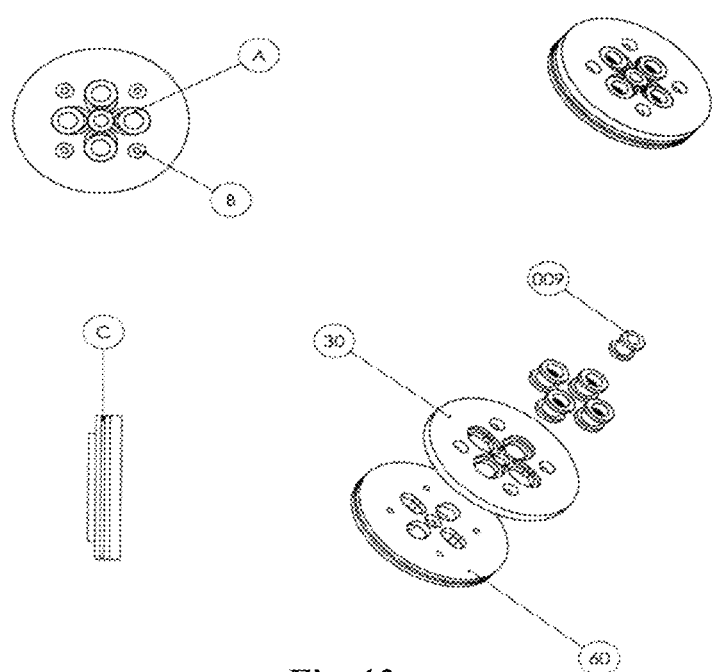

The internal fixture subassembly S3 is shown in FIG. 13, while FIG. 14 illustrates the different component parts of the auxiliary center point rod 042 subassembly S4. Subassembly S3 is a combination of the perforated wall 30 and ring spacer 60, and sandwiches the two (2) together using a separation grommet 009 that serves the purpose of canceling out the galvanic reaction between the cathode rods and the perforated wall that would normally take place. This is accomplished using a metal and/or coated metal that will not react with the other metals/alloys utilized in the invention. The component parts of subassembly S3 include, but are not limited to, separation grommet placed in a one-way slideable slot 086 (allows for easier rod installation, aperture hole with a slight countersink 087 helps keep the continuously flowing electrolyte smooth between all chambers), and O-ring 089 on the "updated" ring spacer that gives a better seal when placed inside the inner cylindrical housing during assembly (this feature helps with natural heat expansion and contraction).

In accordance with one or more embodiments of the invention, a metal sleeve 22 may be used in the instant generator assemblies. In a preferred embodiment, a revised metal sleeve may be implemented, such as, the revised metal sleeve 22' assembly shown in FIG. 15. Also, FIGS. 16A-16B respectively shows a revised perforated wall (revised perforated wall 30') and a revised spacer ring (revised spacer ring 60'). Additional views and the assembly thereof are depicted in FIG. 13 which shows the internal fixture subassembly S3. The revised spacer ring assembly of the invention is shown in FIG. 16B, as well as in the internal fixture subassembly S3 of FIG. 13.

Figure 17:
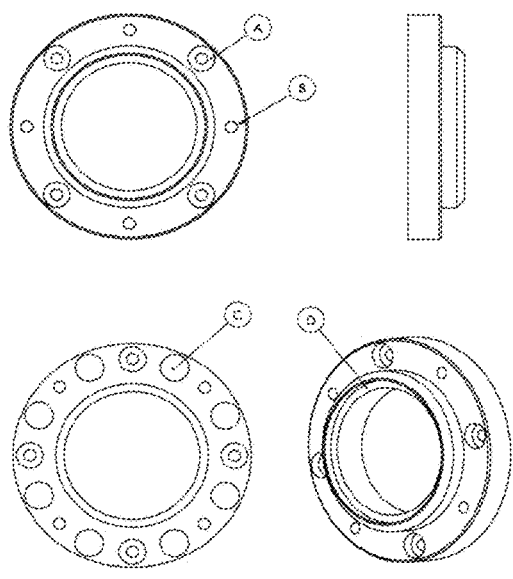
FIGS. 17-18 respectively illustrate the inner flange and the outer flange component parts of the symmetrical hydrogen gas generators in accordance with the invention.

Referring to the component parts of the instant symmetrical hydrogen gas generator 150 apparatus and system, FIG. 17 illustrates the inner flange 001. The inner flange 001 is a first of a two-part flange setup that reduces the amount of hardware while improving clamp force. The inner flange 001 may be countersunk for the flange rod washer (hides the nut), has a through hole for the flange rods, has countersink openings for magnet placement, and is a CNC milled slot for PTFE anti-vibration ring. The inner flange 001 may be composed of aluminum, stainless steel, brass, nylon, PTFE, PVC, CPVC, ABS, polycarbonate, Lucite (PMMA), PETE, phenolic, PETG and/or silicone carbide. A coating may be applied to the inner flange 001. The coating may include anodized, gold and silver electroplating, medical grade electro-polish, plasma, ceramic, marine gold ceramic, gold film, gold plate, silver plate, patina, nickel coat and/or nitrate coat.

Figure 18:
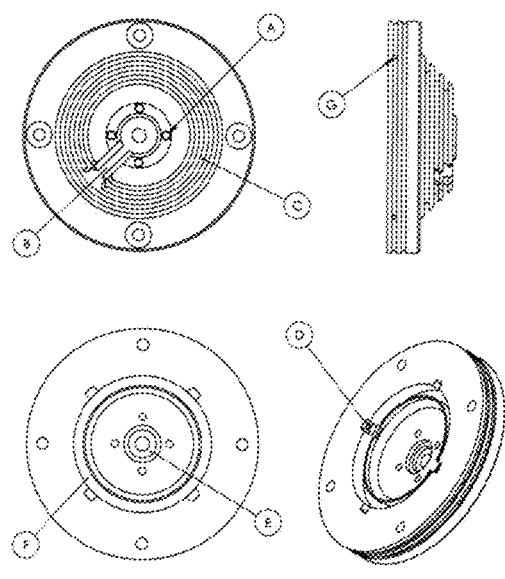

FIG. 18 illustrates the outer flange 002 of the invention. The outer flange 002 includes a cavity for LED rings and/or other electromagnetic and electrostatic components. The outer flanges 002 include a set of screws to apply pressure against the end cap sleeve for assembly and maintenance. It may have a CNC milled out channel for a negative wire. The outer flange 002 may also have heat resistant fins in close proximity to a computer CPU heat sink. A drilled hole holds a three-part insulated 22-gauge wire, while a counter bore holds a PFTE Teflon and/or nylon washer. The CNC milled out channel holds the LED rings and/or the electromagnetic deflection loop, etc. The outer hole holds a three-part 22-gauge wire.

The outer flange 002 may be composed of aluminum, stainless steel, brass, nylon, PTFE, PVC, CPVC, ABS, polycarbonate, Lucite (PMMA), PETE, phenolic, PETG and/or silicon carbide. A coating may be applied to the outer flange 002. The coating may include anodized, gold and silver electroplating, medical grade electro-polish, plasma, ceramic, marine gold ceramic, gold film, gold plate, silver plate, patina, nickel coat and/or nitrate coat.

Figure 19:
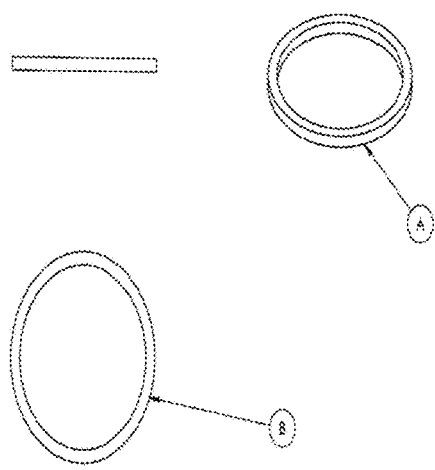
FIG. 19 illustrates the vibration resistant ring or insulator rings component parts of the symmetrical hydrogen gas generators in accordance with the invention.

FIG. 19 shows the vibration resistant ring or insulator rings 003. These rings may be CNC milled PFTE Teflon anti-vibration and thermal quality gasket for the inner and outer flanges. The face of these insulator rings may be drilled and the edges may be chamfered. The vibration resistant insulator rings may be composed of aluminum, stainless steel, brass, nylon, PTFE, PVC, CPVC, ABS, polycarbonate, Lucite (PMMA), PETE, phenol, PETG and/or silicone carbide. A coating may be applied thereto. The coating may include anodized gold and silver electroplating, medical grade electro-polish, plasma, ceramic, marine gold ceramic, gold film, gold plate, silver plate, patina, nickel coat and/or nitrate coat.

Figure 20:
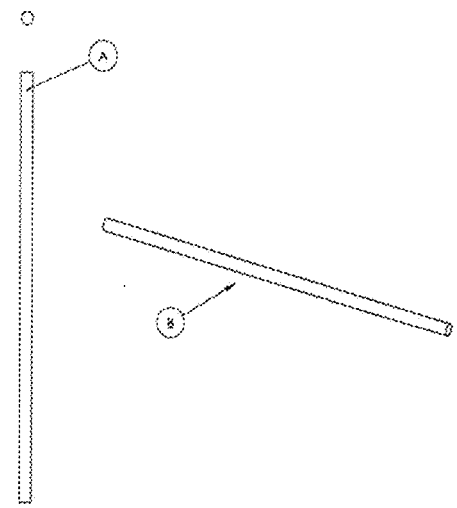
FIG. 20 illustrates the flange rods component parts of the symmetrical hydrogen gas generators in accordance with the invention.
Figure 21:
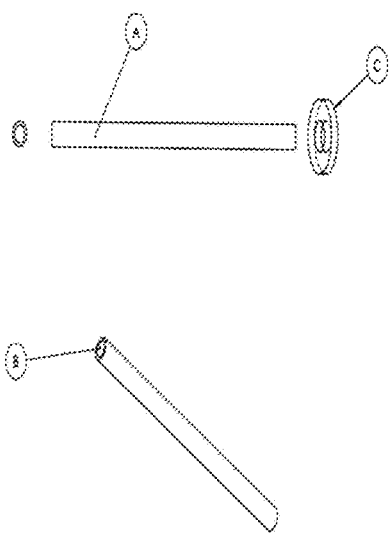
FIG. 21 illustrates the flange sleeves of the symmetrical hydrogen gas generators in accordance with the invention.

The flange rods 004 are shown in FIG. 20, while the flange sleeves 005 are shown in FIG. 21. The flange rods 004 may hold the 2 "inner flanges" together with a slotted nut and washer. These flange rods 004 may be a threaded rod or a non-threaded center rod (always with heat shrink wrap coated). The flange sleeves 005 may be a sleeve coated with heat shrink wrap that protects the "flange rods" from physical damage and electrostatic discharge. The flange sleeves 005 may have outer faces that are micro polished. The flange sleeves 005 slide over the flange rods 004, which are heat shrink wrapped (Electrostatic discharge (ESD) and non-conductive barrier). Flange spacer "washer" may be compressed between the "flange sleeve" and "inner flange", which also serves as an ESD and/or conductive separator. Both the flange rods 004 and the flange sleeves 005 may be composed of aluminum, stainless steel, brass, nylon, PTFE, PVC, CPVC, ABS, polycarbonate, Lucite (PMMA), PETE, phenolic, PETG and/or silicone carbide. A coating may be applied thereto comprising anodized gold and silver electroplating, medical grade electro-polish, plasma, ceramic, marine gold ceramic, gold film, gold plate, silver plate, patina, nickel coat and/or nitrate coat.

Figure 22:
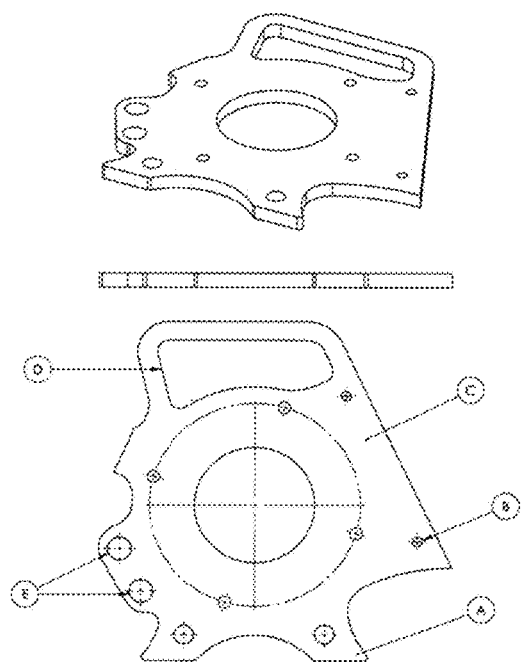
FIG. 22 illustrates the flange spacers component parts of the symmetrical hydrogen gas generators in accordance with the invention.

FIG. 22 shows flange spacers 006 which serve multiple functions in the instant hydrogen gas generator assemblies of the invention. The flange spacers 006 provide a conductive barrier between the two (2) flanges while providing additional functions, such as, feet, wire braces, face plate mounts, electronics mount, handles, etc. The instant hydrogen gas generator assemblies/units may sit on the feet of flange spacers 006. The flange spacers 006 each have drilled holes for faceplate mount, face for aluminum mount, and handles for portability and any other basic usage. The flange spacers 006 may also be composed of aluminum, stainless steel, brass, nylon, PTFE, PVC, CPVC, ABS, polycarbonate, Lucite (PMMA), PETE, phenolic, PETG and/or silicone carbide. A coating may be applied thereto comprising anodized gold and silver electroplating, medical grade electro-polish, plasma, ceramic, marine gold ceramic, gold film, gold plate, silver plate, patina, nickel coat and/or nitrate coat.

Figure 23:
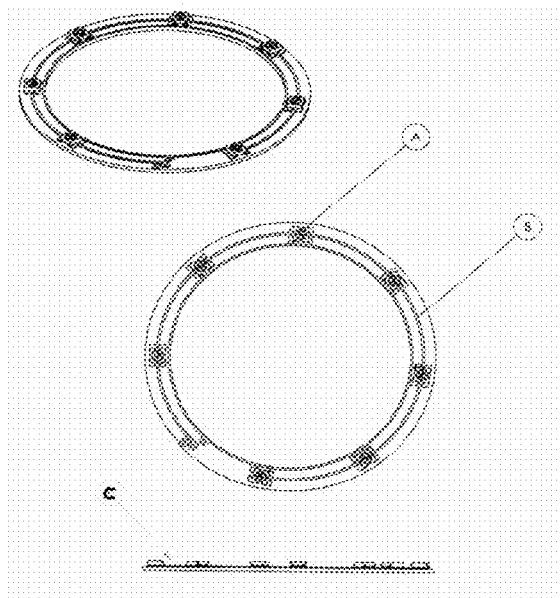
FIG. 23 illustrates the LED rings component parts of the symmetrical hydrogen gas generators in accordance with the invention.
Figure 24:
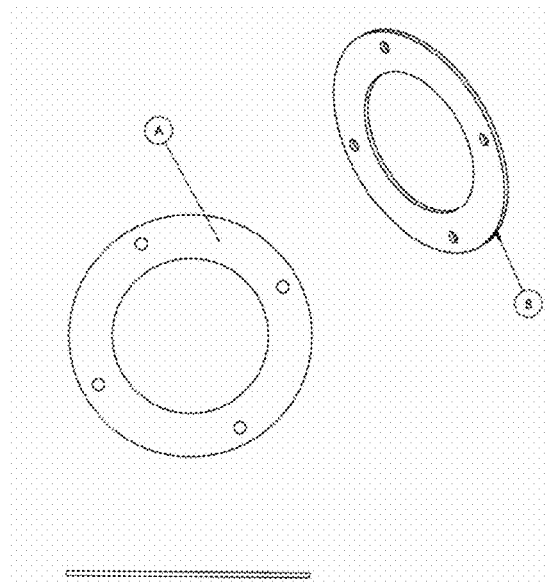
FIG. 24 illustrates other flange spacers of the symmetrical hydrogen gas generators in accordance with the invention.

LED rings 007 are shown in FIG. 23, while flange spacers 008 are shown in FIG. 24. The LED ring may be a CNC milled copper/silicone electronics board with neo pixel paths supporting multi-function colors. It includes intelligent neo pixel led (can utilize "uv" type leds to kill bacteria), and a milled-out path of copper for attaching circuits. The flange gaskets 008 are specialized crushable PTFE Teflon foam, which hold extremely high heat levels and crush down to a reliable gasket that does not lose its form. Selected component parts of the rings 007 and flange gaskets 008 may be composed of aluminum, stainless steel, brass, nylon, PTFE, PVC, CPVC, ABS, polycarbonate, Lucite (PMMA), PETE, phenolic, PETG and/or silicone carbide. Coatings may include anodized gold and silver electroplating, medical grade electro-polish, plasma, ceramic, marine gold ceramic, gold film, gold plate, silver plate, patina, nickel coat and/or nitrate coat.

FIG. 25 depicts the separation grommets 009. These parts may be referred to as "plug" or a "post and barrel" that provide a thread sealed cylinder with two edges/lips. The separation grommets 009 may include a smooth hollow pass through, male threaded cylinder and a mating female threaded cylinder. Materials of the separation grommets 009 may include aluminum, stainless steel, brass, nylon, PTFE, PVC, CPVC, ABS, polycarbonate, Lucite (PMMA), PETE, phenolic, PETG and/or silicone carbide. A coating may be applied thereto comprising anodized gold and silver electroplating, medical grade electro-polish, plasma, ceramic, marine gold ceramic, gold film, gold plate, silver plate, patina, nickel coat and/or nitrate coat.

The terminal cap 010 is shown in FIG. 26, and the anode distribution wire 012 and cathode distribution wire 013 are shown in FIGS. 27A and 27B, respectively. The terminal cap 010 may be a modified notched out negative terminal press fit cap (drilled out for breathing). It may include a notch for wire/cable, and drilled breather holes. The anode and cathode distribution wires 012, 013 shown in FIGS. 27A-B comprise audio wire with insulated housing having an 8-gauge through 2-gauge wire donut connectors. The anode distribution wires 012 run between anodes on the generator unit to make an equal and balanced connection while dissipating excess heat. The cathode distribution wires 013 are equal in length and run from the end cap (−) terminals to the (−) terminal block. This balanced and equal wire distribution provides the benefit of center point ground setup (generators symmetrical negative and or cathode terminal configuration).

Also included in the instant hydrogen gas generator assemblies are auxiliary anode terminals 011 and collection terminals 014. The auxiliary anode terminals 011 comprise two (2) extra anodes running adjacent to the other 4 anode terminals (in the center of the unit to the unit). The collection terminals 014 are blocks of conductive alloy that attach to the "flange spacers" on both sides separating the positive and negative connections. Various components of the above parts 010-014 may include aluminum, stainless steel, brass, nylon, PTFE, PVC, CPVC, ABS, polycarbonate, Lucite (PMMA), PETE, phenolic, PETG and/or silicon carbide. They may also include a coating of anodized gold and silver electroplating, medical grade electro-polish, plasma, ceramic, marine gold ceramic, gold film, gold plate, silver plate, patina, nickel coat and/or nitrate coat.

Referring to FIGS. 28A-28B, the housing film 015 and outer cylindrical housing 016 are shown. The housing film 015 may be utilized either between the inner and outer sleeves, or just as an outer protective coat. This housing film 015 is a protective and/or sealable layer that provides high thermal protection while also providing expandable properties that benefit the overall assembly strength. The housing film 015 may include a cross section or seam at which the film meets to complete a full coat. It may be heat applied, adhesive backed, or solvent activated.

The outer cylindrical housing 016 protects the original housing as shown in FIG. 10. This outer cylindrical housing 016 serves as a safety feature, as well as helping to properly seal ports for long term use. The inside surface of the outer cylindrical housing may be coated and/or layered in a safety film. The outside of the outer cylindrical housing may also be covered and protected with "safety film" and/or "uv" acceptable coatings to help aid bacteria removal when unit is glowing. Laser scribed markings (e.g., trademarks and patent numbers) or labels (e.g., warning labels) may reside on a portion of the outer cylindrical housing.

FIG. 29 shows the end cap O-rings 017. These end cap O-rings 017 are crushed between the "end caps and the "core/metal sleeve" to create a gas ready seal. They may be cylindrical type (round) O-ring, a (square) type O-ring, or they may be a (gel/liquid) filled spread type O-ring.

Port sleeve 018 and port sleeve washer 019 are shown in FIGS. 30A-30B. The port sleeve 018 provides a perfect seal between the inner and outer cylindrical housings in relation to the "core" aka metal sleeve that presses against a specialized "port sleeve washer". The port sleeve 018 includes an outer face that mates with the "outer cylindrical housing" when installed, and an inner face that mates with the "inner cylindrical housing." The inner face presses into the "port sleeve washer" 019. A port sleeve edge presses up against the counter bored inner cylindrical housing (add epoxy or glue). The port sleeve washer 019 is embedded between the inner cylindrical housing and the "core"—aka—metal sleeve to make an extremely reliable press fit when the port sleeve is installed.

FIG. 31 shows the multi-point cylindrical anode tube 020. This anode tube 020 is a drilled-out cylinder enhanced by either rivets of specialized material and/or plugs that fit like "post and barrels". The multi-point cylindrical anode tube 020 includes a drilled hole pattern in a cylindrical tube that provides an electrical matrix and serves as cooling/gas venting ports while the generator is in use. It may have a slotted hole for easy fitment of anode terminals during product assembly, and a plug type fixture that resembles a post and barrel. The present assemblies and systems may also include an anode tube flow control mesh 021. This may be a poly mesh material that separates the anode tube from the "core" aka metal sleeve for a reliable "material spacing" to help aid the proper assembly of the generator internals.

Spring guide 022 is shown in FIG. 32. This spring guides helps in assembling of the system and aids in the electrical capacitance control of the (−) charge within the "end caps". The spring guide 022 has an outer face surrounded by solution, and a knife edge facing the center of the generator to help guide springs when system is assembled.

FIG. 33 shows the spring retainer 023, which press fits inside of the end cap (−) terminal fittings creating a poly (non-conductive) structure to help aid in assembly as well as center the cathode springs. The spring retainer 023 includes notched-cuts to fit the generator internal bolt pattern, drilled holes to allow solution flow and electrolysis between the surrounding parts, a bottom chamfer to help press fit against the inner end cap terminals, and an area in which the "spring guide" will set to allow for perfect centered assembly. The system also includes terminal relay modules 024 comprising blocks that gather either (−) or (+)/anode or cathode wiring to a convenient and safe collector.

Figure 34:
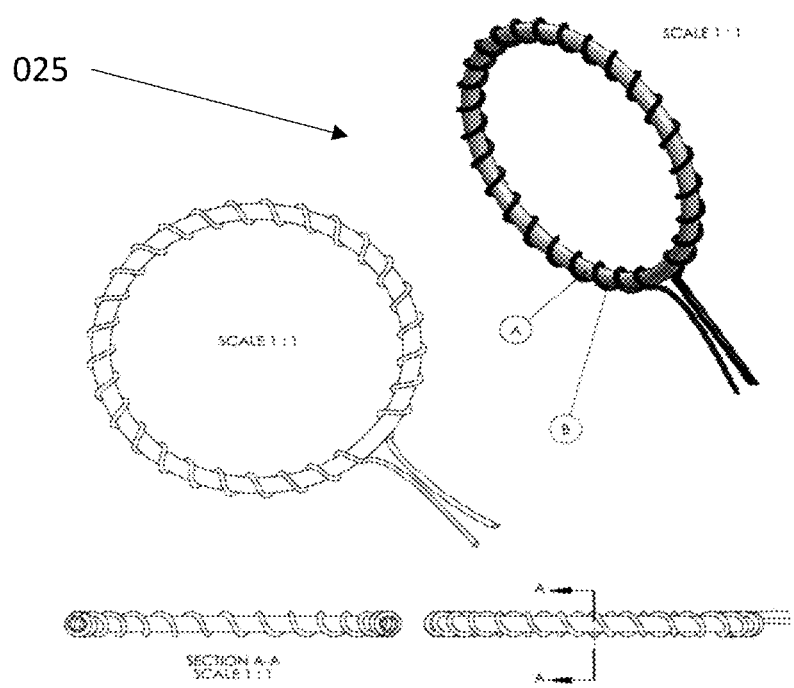
FIGS. 34-36 respectively illustrate the electromagnetic deflection loop, electromagnetic wrapped coil, and the electromagnetic flange setup of the symmetrical hydrogen gas generators of the invention.
Figure 35:
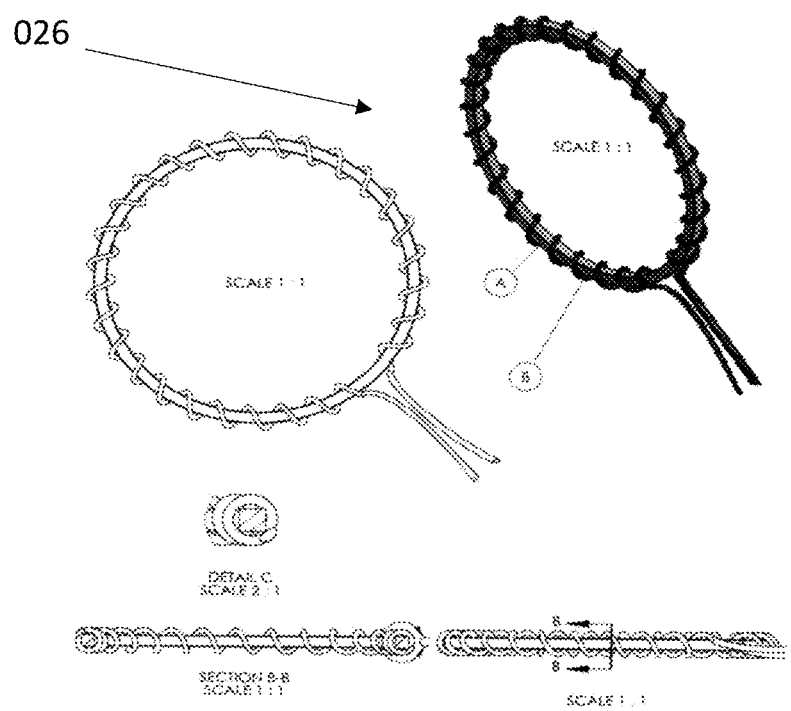

Referring to FIGS. 34-36, the electromagnetic deflection loop 025, electromagnetic wrapped coil 026, and the electromagnetic flange setup are respectively depicted. The electromagnetic deflection loop 025 functions via electrostatics and absorbs and/or retains charge from the component parts working inside the symmetrical hydrogen gas generators of the invention. The loops 025 may be a hollow aluminum tube having a wrapped wire for charge control based off voltage in. The electromagnetic wrapped coil 026 may be composed of a solid machined magnet and/or a series of magnets in the form of a circle. This coil 026 may be wrapped with wire that can apply voltage-in to provide an enhancement of electromagnetic force. It may include a machined magnet and/or a series of magnets. The electromagnetic deflection loop 025 is a wrapped wire for charge control based off voltage generated inside the present symmetrical hydrogen gas generator 150.

As shown in FIG. 36, the outer flanges 002 have the ability to hold either the electromagnetic deflection loop and/or the electromagnetic wrapped coil within the recessed cut-out (the LED ring may also be placed in this recessed cut-out). The inner flange 001 is shown with extra counter bores in which magnets may be placed in. The invention may be provided with coil and LED options, as well as magnet options of either solid or donut type.

Figure 37:
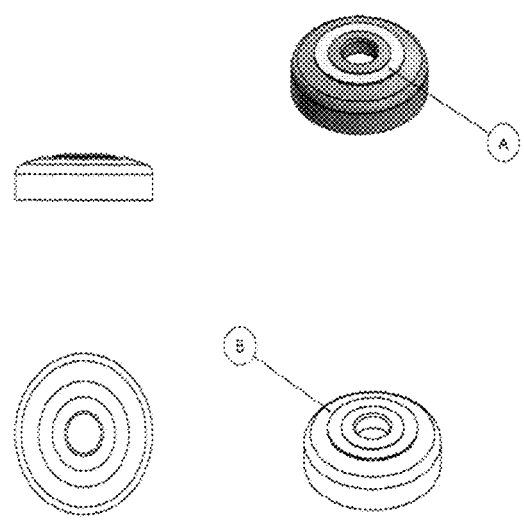
FIG. 37 illustrates the end cap collar component parts of the symmetrical hydrogen gas generators in accordance with the invention.

The end cap collar 027 is shown in FIG. 37. The end cap collar 027 fits as a collar on the outer face of the "end caps" and has a metal ring embedded in it to resist indentation of the material when set screws are tightened. These end caps 027 include a cylindrical plate to withstand pressure from "set screws" and have an outer polymer structure.

FIG. 38 shows the honeycomb anode tube 028 that utilizes the efficient structure of a bee hive to create an electrical matrix to react off the internal working components within the instant symmetrical hydrogen gas generators 150 (i.e., "the internals) and/or vice versa. The honeycomb anode tube includes drilled slots for anode placement (shape makes product assembly easier). The honeycomb structure is a strong structure that provides a significant amount of surface area while having the ability to dissipate heat naturally.

The cathode direct connection spring 029 is shown in FIG. 39. This spring fits around the spring retainer while pressing against the face of the "perforated wall".

Figure 41:
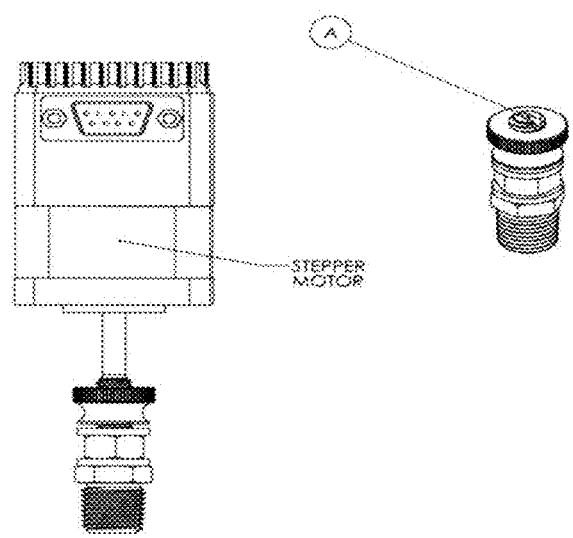
FIG. 41 illustrates the adjustable anode terminals component parts of the symmetrical hydrogen gas generators in accordance with the invention.

FIG. 40 shows the control panel 030 that may be composed of two halves in order to provide a water tight seal that embeds a touch screen or a basic strip that allows electronics to be mounted to it. The control panel 030 may be a water tight touch screen that includes various buttons or controls including, for example, on/off, select, back, etc. The present system may also include a connection pill 031 that is a cylindrical piece of metal that slides inside the inner cathode end cap spring that presses up against the (−) terminal to the "center point rod" 041. The adjustable anode terminals 032 are shown in FIG. 41. The adjustable anode terminals 032 generally consist of a threaded rod with a cross-section cut that can utilize a stepper motor (self-adjusting). The system also includes a terminal thumb nut 033.

Figure 42:
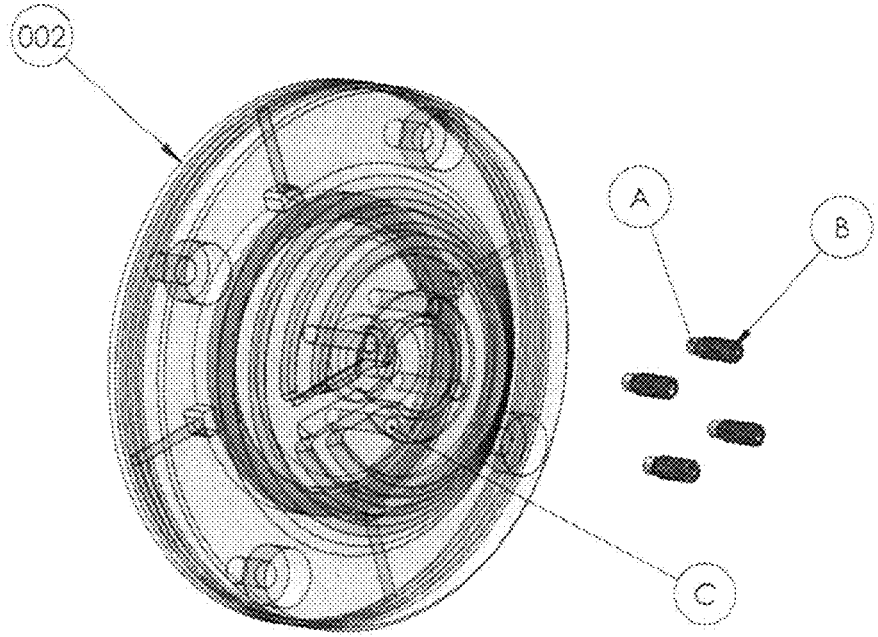
FIGS. 42 and 43 respectively illustrates the anode loop wires and the auxiliary distribution wires of the symmetrical hydrogen gas generators of the invention.

Referring to FIG. 42 the flange set screws 034 are shown. These screws serve as maintenance options to tighten the "end caps" over time (e.g., crush the end cap O-rings) and equally tighten the unit when assembled. The set screws have swivel parts of the screws, and Allen key or hex key end of set screw.

Figure 43:
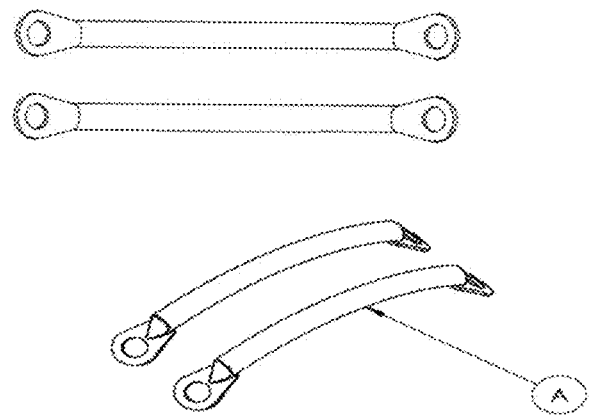
Figure 44:
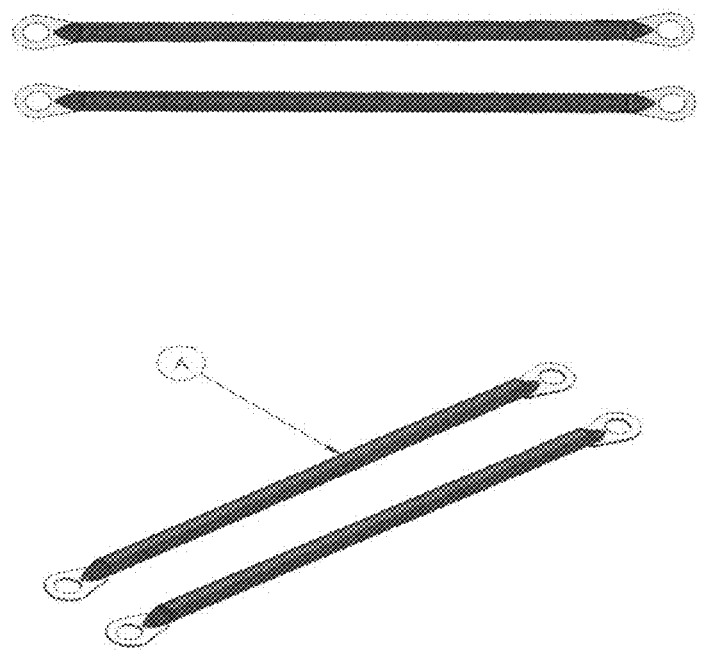
FIG. 44 illustrates the cathode direct connection spring of the symmetrical hydrogen gas generators of the invention.

The anode loop wires 035 and auxiliary distribution wires 036 are shown in FIGS. 43 and 44, respectively. The anode loop wires 035 connect the 4-point anode terminals in a symmetrical/balanced manner. They may be composed of generally insulated audio wire of 4-8 gauges.

The advanced processing unit 038, gas/water separator 039 and by-product return pump 040 components of the hydrogen gas generator assemblies of the invention are shown in FIG. 44.

Figure 45:
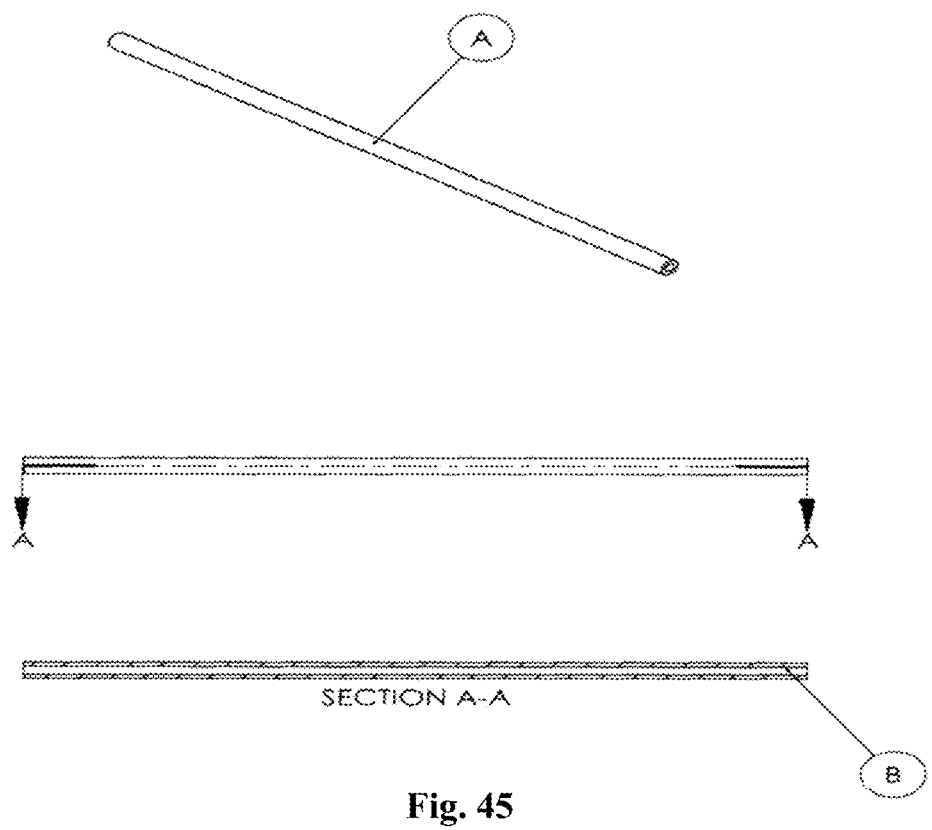
FIG. 45 illustrates a single piece center-point rod of the symmetrical hydrogen gas generators in accordance with the invention.
Figure 46:
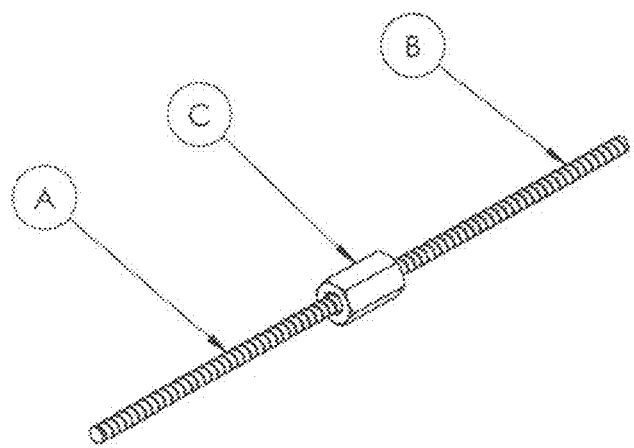
FIG. 46 illustrates another embodiment of a multi-piece center-point rod of the symmetrical hydrogen gas generators in accordance with the invention.
Figure 50:
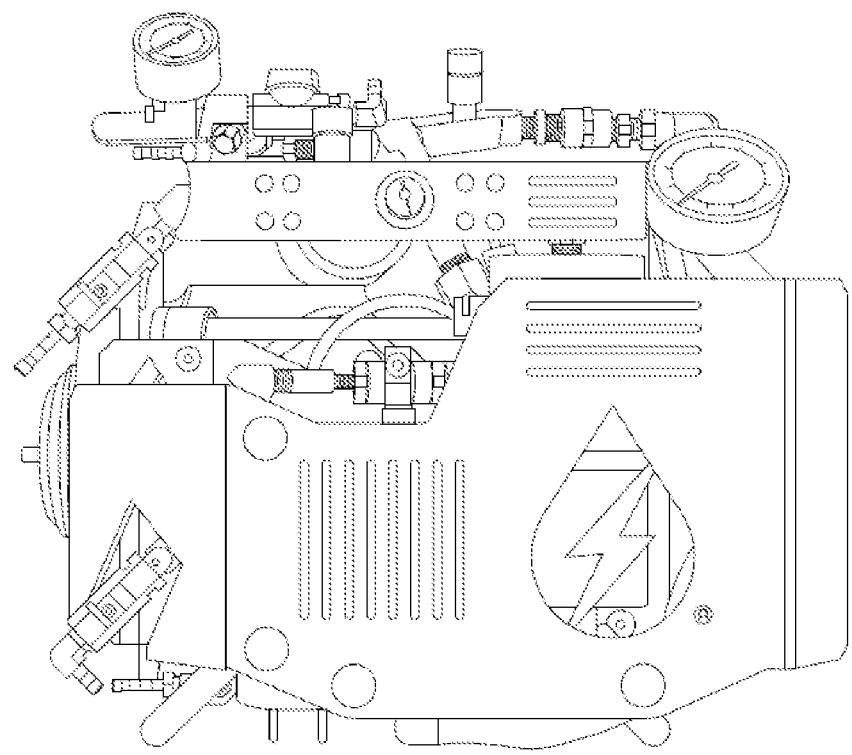
FIGS. 50-53 illustrate various perspective views of symmetrical hydrogen gas generators assemblies and systems according to the present invention.
Figure 51:
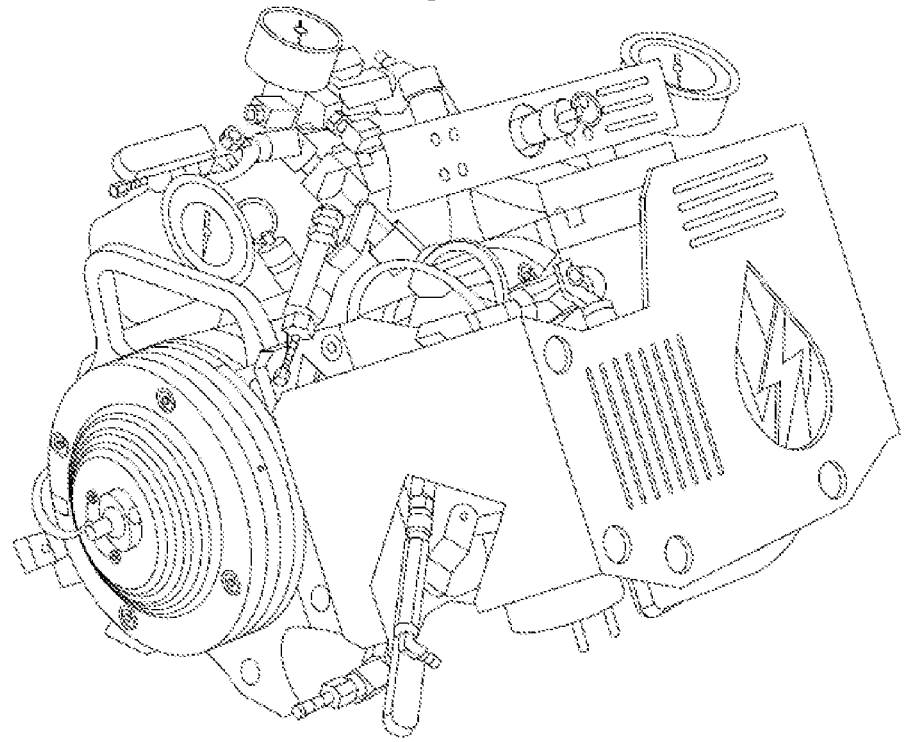
Figure 52:
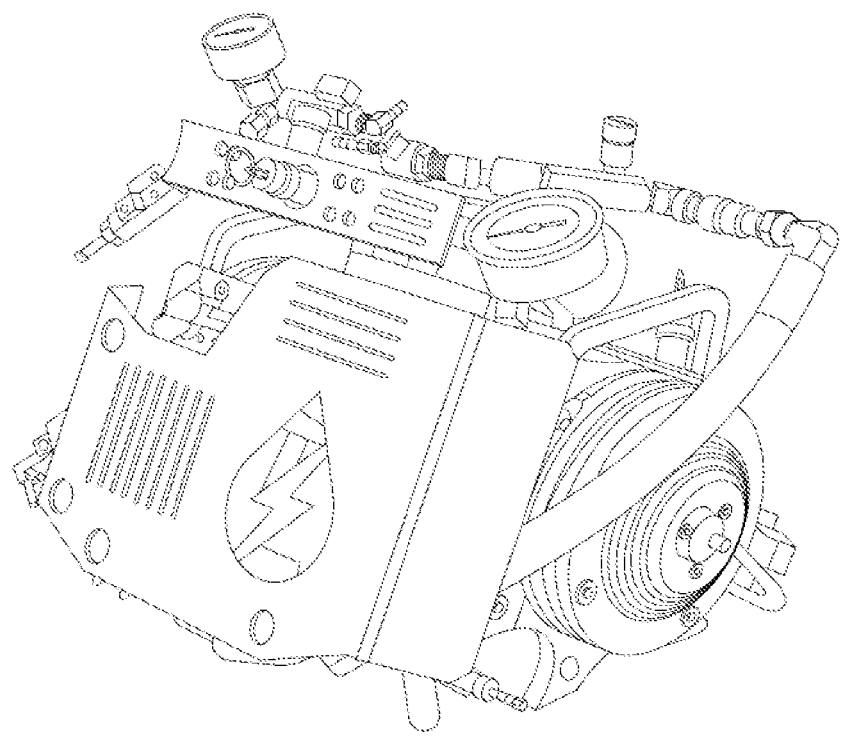

Referring to FIG. 45, the center point rod 041 is shown having an outside tube face and a hollow center. The center point rod generally is the (center point ground) connection through the dead center of the generator. In another embodiment, an alternate configuration of the center-point rod is shown as multi-piece center-point rod 042, as shown in FIG. 46. This includes a threaded rod (a), threaded rod (b), and a joiner or connection piece that provides an open pocket to join two separate center-point rods together. The multi-piece center-point rod 042 is an important component of the invention as it is a 3-piece design that allows materials and/or matter to be concealed within the (joiner/connection piece), which holds the two (2) halves together. It should be appreciated that more than two separate center-point rods may be joined together via two or more joiner/connection devices to provide the generator 150 assembly with various properties (e.g., one or more magnets may be embedded within one of the joiner/connection devices, while crystalline materials are embedded within the other joiner/connection devices).

FIG. 47 shows the transparent window seal 043 having a face that mates with "metal sleeve"—aka—core. The face may be glued on and around the face/edges for extra support. This transparent window seal is a gasket like fixture that press fits into the "activity window" to create a better more reliable seal due to surface area (should be glued in place). FIG. 48 illustrates the one-piece housing 044 component of the present invention, while FIG. 49 shows the flange void 045 as a large spring that resides between the "end cap" and the "outer flange".

In accordance with the invention, the various symmetrical hydrogen gas generators 150 of the invention equally split a positive direct current electric charge via the anode loop wires 035, which are automatically adjusted up and down via step motors. That is, adjustments are made based on salt content of the solution or to modify the liters per minute output of oxygen to hydrogen by generating more or less space between the anodes and cathode rods. In doing so, a preferred electric field is generated around the anode tube. This charged electric field is balanced and controlled by the symmetry of the present generators 150, and generator assemblies/systems 350, and in particular, by the balanced symmetrical ground center point rod 041.

In the generators 150 of the invention, the current starts at the anodes and travels inside the generator 150 with the center point rod 041 as its destination. The flow of electricity in accordance with the invention is achieved through the proper choice and spacing of metals and alloys for both anode and cathode utilizing mutual capacitance with the salt water solution as its dielectric separation fluid. The symmetry, balanced shaped design of the present generators 150 allows for a continuous flowing electrolyte through all chambers of the generator. This flow of solution allows for optimum efficiency due to the cooling effect it has on the internal working components inside the generator 150 as a result of the naturally driven circulation electrolysis provided therein.

In the present symmetrical generators 150 and assemblies/systems 350 (as also shown in FIGS. 50-54), the center point rod 041 (and/or center point rods 042) draws in the positively charged electric field that covers the anode tube so that the direct current passes through the surrounding rods (i.e., the 4 surrounding rods) and is pulled out equally to each center point end inside the generator unit 150 (which leads out to the negative terminals and to the negative wires). Together, the component parts residing inside the present symmetrical generators 150 along with the rounded shapes/forms of the generator configuration, as well as the drilled holes, all work together to amplify this controlled positively charged electric field effect to equally distribute the generated electricity to the desired locations. This equally distributed electricity effect is also a result of the proper spacing and control of capacitance inside the generator 150, along with the symmetrical design and aperture holes allowing for the continuous following electrolyte to pass through the main body into each end chamber.

While not meant to limit the invention, as exemplary embodiments the multi-piece center point rod 042 may be embedded with magnets is shown in FIGS. 14 and 46. The embedded magnets enhance and benefit the electrochemistry reactions generated by and within the present symmetrical hydrogen gas generators 150. In one or more embodiments, one or more magnets may be provided in a symmetrical configuration inside the generator 150 to control the electrical flow therein (based on a north and south pole configuration). The symmetrical, balanced grounding of the present generators 150 pulls in the electrical charge, which is then regulated via the center point rod 041 residing in the direct dead center of the generator 150. The regulation may be to speed up electrical current flow or slow down electrical current flow. The use of the electromagnetic deflection loop 025 (see, FIGS. 36 and 34) may be used to cancel out or dampen un-wanted electromagnet waves.

In another exemplary embodiment the multi-piece center point rod 042 may be embedded with crystalline materials (e.g., minerals, quartz crystal, amber, etc.). A crystalline material embedded multi-piece center point rod 042 may be used to control and modify electrical frequency. The crystalline materials are embedded centrally within the generator 150 since they are embedded at the center of the multi-piece center point rod 042 inside the connection device. The crystalline materials inside the generators 150 provide the present assemblies and systems with the ability to fine tune the current electrical path from alternating current to pulsing direct current and even oscillating current.

Use of the electromagnetic coils 026 in the present generators assists in preventing frequency from leaking, while the electromagnetic deflection loop 025 blocks escape of un-wanted high frequency. The present symmetrical hydrogen gas generators 150 and assemblies/systems may be used with a variety of different solutions (e.g., brine solutions).

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A hydrogen generating assembly comprising:
a symmetrical hydrogen generating device comprising an anode and a cathode;
a housing encapsulating the symmetrical hydrogen generating device; and
a center-point rod residing directly in a center of the symmetrical hydrogen generating device, wherein the center-point rod resides entirely within and is encapsulated by the symmetrical hydrogen gas generating device,
whereby together the symmetrical hydrogen generating device, the housing and the center-point rod providing a symmetrical hydrogen gas generator, with the housing and the center-point rod improving workability and efficiency of the symmetrical hydrogen gas generating device.

2. The assembly of claim 1 wherein the symmetrical hydrogen generating device comprises:
a first housing having the anode and the cathode within an internal cavity thereof;
a cylindrical metal sleeve slidingly disposed within the internal cavity of the first housing;
a perforated wall within the cavity near an end thereof electrically connected to the anode or the cathode and separating an end portion of the cavity from a main portion of the cavity; and
water in the first housing extending continuously from the main portion of the cavity through the perforated wall and into the end portion of the cavity.

3. The assembly of claim 2 wherein the center-point rod resides longitudinally in the center of the internal cavity.

4. The assembly of claim 1 wherein together the housing and center-point rod have a symmetrical configuration.

5. The assembly of claim 1 wherein the center-point rod resides longitudinally at the direct center inside the symmetrical hydrogen gas generating device.

6. The assembly of claim 1 wherein the center-point rod extends longitudinally from a first chamber end to a second chamber end inside the symmetrical hydrogen gas generating device.

7. The assembly of claim 1 wherein the center-point rod is attached to the housing.

8. The assembly of claim 1 wherein the center-point rod is a part of the housing.

9. The assembly of claim 1 wherein the center-point rod comprises a conductive material.

10. The assembly of claim 9 wherein the conductive material is selected from the group consisting of aluminum, stainless steel, brass, nylon, PTFE, PVC, CPVC, ABS, polycarbonate, Lucite, PMMA, PETE, phenol, PETG and silicone carbide.

11. The assembly of claim 1 wherein the center-point rod is made of a solid material.

12. The assembly of claim 1 wherein the center-point rod has a hollow center.

13. The assembly of claim 1 wherein the center-point rod includes a coating.

14. The assembly of claim 13 wherein the coating is selected from the group consisting of an anodized coating, a gold electroplate, a silver electroplate, a plasma spray coating, a ceramic coating, gold film, gold plate, silver plate, patina, and a nickel coating.

15. The assembly of claim 1 wherein the center-point rod comprises a single rod providing a one-piece center-point rod residing directly in the center of the symmetrical hydrogen gas generating device.

16. The assembly of claim 1 wherein the center-point rod comprises at least two rods connected together lengthwise by a connector device providing a multi-piece center-point rod residing directly in the center of the symmetrical hydrogen gas generating device.

17. The assembly of claim 16 wherein the center-point rod comprises a plurality of rods connected together by a plurality of connector devices.

18. The assembly of claim 16 wherein the connector device has one or more openings residing therein for securing a material within the opening, the material providing one or more desired functions to the symmetrical hydrogen gas generator.

19. The assembly of claim 18 wherein the material secured inside the one or more openings in the connector device is one or more magnets that enhance electrochemistry reactions within the symmetrical hydrogen gas generator.

20. The assembly of claim 18 wherein the material secured inside the one or more openings in the connector device is one or more crystalline materials that control and modify electrical frequency within the symmetrical hydrogen gas generator.

21. The assembly of claim 20 wherein the one or more crystalline materials are selected from group consisting of minerals, quartz crystal, and amber.

22. The assembly of claim 16 wherein the at least two rods of the center-point rod each comprise a conductive material.

23. The assembly of claim 22 wherein the at least two rods comprise a same conductive material, or one or more different conductive materials.

\* \* \* \* \*